United States Patent
Zhao et al.

(10) Patent No.: US 6,601,671 B1
(45) Date of Patent: Aug. 5, 2003

(54) METHOD AND APPARATUS FOR SEISMICALLY SURVEYING AN EARTH FORMATION IN RELATION TO A BOREHOLE

(75) Inventors: Xiaomin Zhao, Sugarland, TX (US); Francis X. Bostick, Houston, TX (US); Jian-Qun Wu, Houston, TX (US); Daniel L. Gysling, Glastonbury, CT (US); Peter C. Ogle, Charlestown, RI (US); Allen R. Davis, Glastonbury, CT (US); Alan D. Kersey, South Glastonbury, CT (US); Bob A. Hardage, Austin, TX (US)

(73) Assignee: Weatherford/Lamb, Inc., Houston, TX (US)

(*) Notice: Subject to any disclaimer, the term of this patent is extended or adjusted under 35 U.S.C. 154(b) by 0 days.

(21) Appl. No.: 09/612,775

(22) Filed: Jul. 10, 2000
(Under 37 CFR 1.47)

(51) Int. Cl.[7] .......................... G10K 11/00; C01B 11/16

(52) U.S. Cl. .......................... 181/108; 181/122; 356/32

(58) Field of Search .......................... 181/108–112, 122; 356/32, 33, 35.5; 250/227.15, 227.14, 227.16, 227.18; 73/705, 800; 385/1, 4, 12–14, 37, 45

(56) References Cited

U.S. PATENT DOCUMENTS

| | | |
|---|---|---|
| 2,846,662 A | 8/1958 | Sparks |
| 4,360,272 A | 11/1982 | Schmadel et al. |
| 4,589,285 A | 5/1986 | Savit |
| 4,649,529 A | 3/1987 | Avicola |
| 4,745,293 A | 5/1988 | Christensen |
| 4,761,073 A | 8/1988 | Meltz et al. |
| 4,806,012 A | 2/1989 | Meltz et al. |
| 4,825,424 A | 4/1989 | Lamb et al. |
| 4,898,236 A | 2/1990 | Sask |
| 4,950,883 A | 8/1990 | Glenn |
| 4,996,419 A | 2/1991 | Morey |
| 5,051,965 A | 9/1991 | Poorman |
| 5,111,903 A | 5/1992 | Meynier |
| 5,163,321 A | 11/1992 | Perales |
| 5,308,973 A | 5/1994 | Odoni et al. |
| 5,317,383 A | 5/1994 | Berni |
| 5,319,435 A | 6/1994 | Melle et al. |
| 5,327,216 A | 7/1994 | Berni |
| 5,339,696 A | 8/1994 | Carignan |
| 5,353,637 A | 10/1994 | Plumb et al. |
| 5,361,130 A | 11/1994 | Kersey et al. |

(List continued on next page.)

FOREIGN PATENT DOCUMENTS

| | | |
|---|---|---|
| EP | 0647764 | 4/1995 |
| WO | 8503105 | 7/1985 |
| WO | WO 01/25800 | 4/2001 |

OTHER PUBLICATIONS

WO 02/04984: International Search Report for corresponding PCT application PCT/US01/21704 (dated Feb. 5, 2002).

W.W. Morey et al. "High Temperature Capabilities and Limitations of Fiber Grating Sensors", pp. 234–237, vol. 2360, Oct. 11, 1994, XP00060148, Proceeding of the SPIE.

(List continued on next page.)

*Primary Examiner*—Khanh Dang
(74) *Attorney, Agent, or Firm*—Howrey Simon Arnold & White, LLP

(57) ABSTRACT

The present invention provides a new and unique method, sensor, and apparatus for performing a seismic survey of an earth formation in relation to a borehole. The method includes arranging at least one strain seismic sensor in conjunction with a borehole structure, and mechanically coupling the borehole structure to the borehole to allow seismic data to be accurately transferred to the sensor. The sensor is preferably a fiber optic sensor, including a Fiber Bragg Grating which may be coupled to a relevant borehole structure in a number of ways.

91 Claims, 23 Drawing Sheets

U.S. PATENT DOCUMENTS

| | | |
|---|---|---|
| 5,380,995 A | 1/1995 | Udd et al. |
| 5,397,891 A | 3/1995 | Udd et al. |
| 5,401,956 A | 3/1995 | Dunphy et al. |
| 5,426,297 A | 6/1995 | Dunphy et al. |
| 5,444,803 A | 8/1995 | Kim et al. |
| 5,451,772 A | 9/1995 | Narendran |
| 5,452,087 A | 9/1995 | Taylor et al. |
| 5,493,113 A | 2/1996 | Dunphy et al. |
| 5,493,390 A | 2/1996 | Varasi et al. |
| 5,495,892 A | 3/1996 | Carisella |
| 5,497,233 A | 3/1996 | Meyer |
| 5,507,341 A | 4/1996 | Eslinger et al. |
| 5,513,913 A | 5/1996 | Ball et al. |
| 5,529,346 A | 6/1996 | Sperring |
| 5,564,504 A | 10/1996 | Carisella |
| 5,675,674 A | 10/1997 | Weis |
| 5,680,489 A | 10/1997 | Kersey |
| 5,767,411 A | 6/1998 | Maron |
| 5,789,669 A | 8/1998 | Flaym |
| 5,804,713 A | 9/1998 | Kluth |
| 5,925,879 A | 7/1999 | Hay |
| 5,987,197 A | 11/1999 | Kersey |
| 6,072,567 A | 6/2000 | Sapack |
| 6,175,108 B1 | 1/2001 | Jones et al. |

OTHER PUBLICATIONS

M.G. Xu et all, "Fiber Grating Pressure Sensor with Enhanced Sensitivity Using A Glass–Bubble Housing", pp. 128/129, vol. 32, Jan. 18, 1996, XP000553416, Electroinics Letters.

Huwen Gai, et al,, "Monitoring and Analysis of ECP Inflation Status Memory Gauge Date", pp. 679–685, Oct. 22, 1996, XP002072648, SPE #36949.

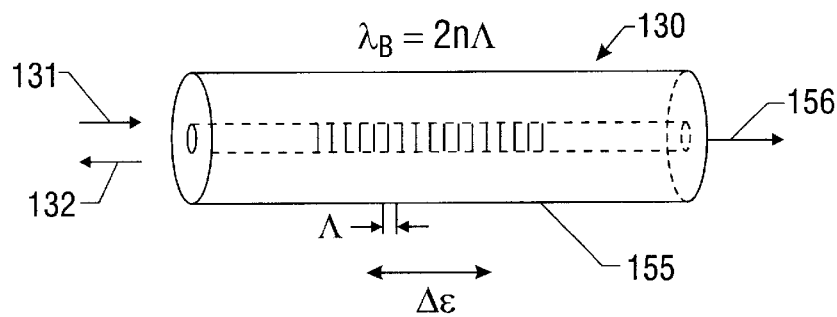
**FIG. 12
(Prior Art)**
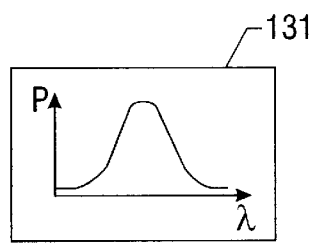
**FIG. 13
(Prior Art)**
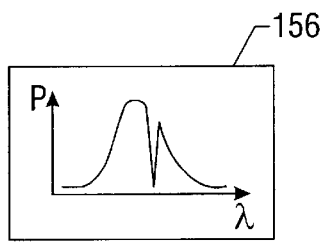
**FIG. 14
(Prior Art)**
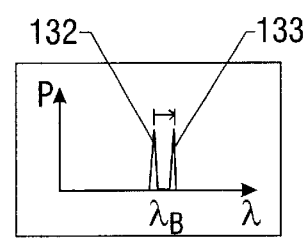
**FIG. 15
(Prior Art)**
$$\Delta\lambda = (1-p_e)\lambda\Delta\varepsilon \quad p_e - 0.22$$
**FIG. 16
(Prior Art)**

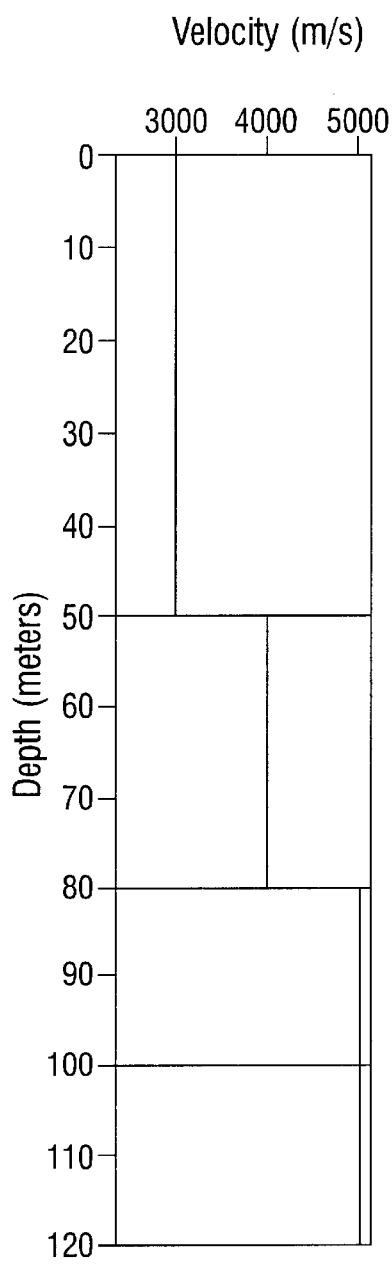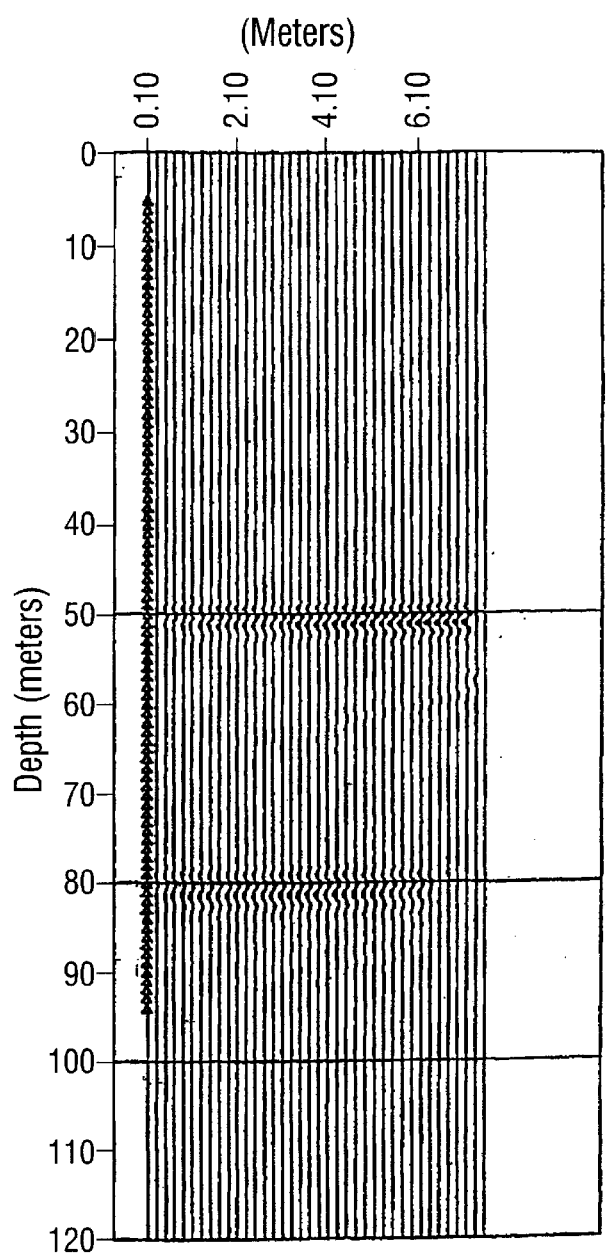
FIG. 22
(Prior Art)
FIG. 23
(Prior Art)

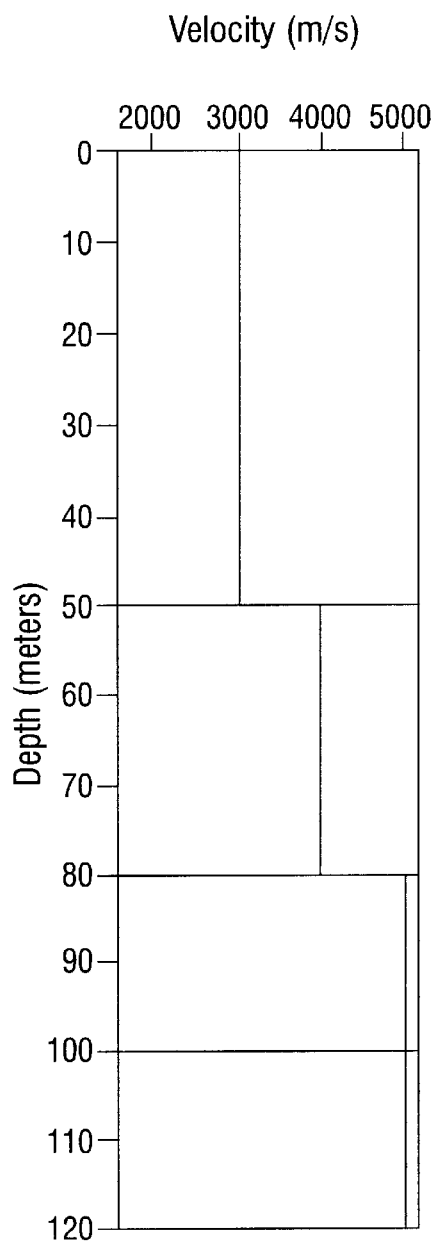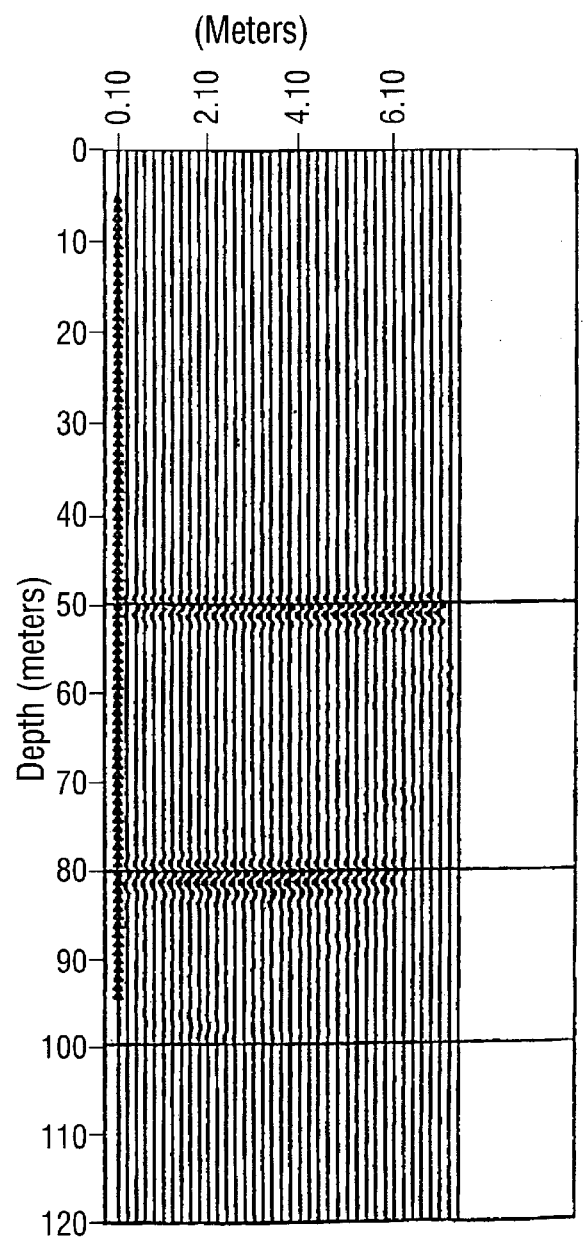
FIG. 24
(Prior Art)
FIG. 25
(Prior Art)

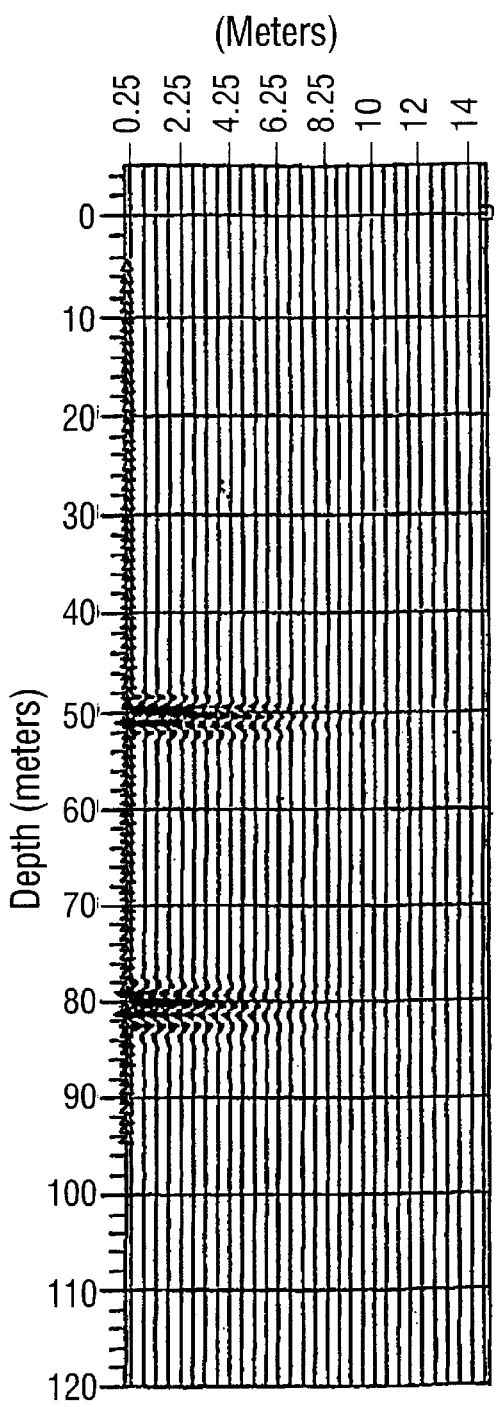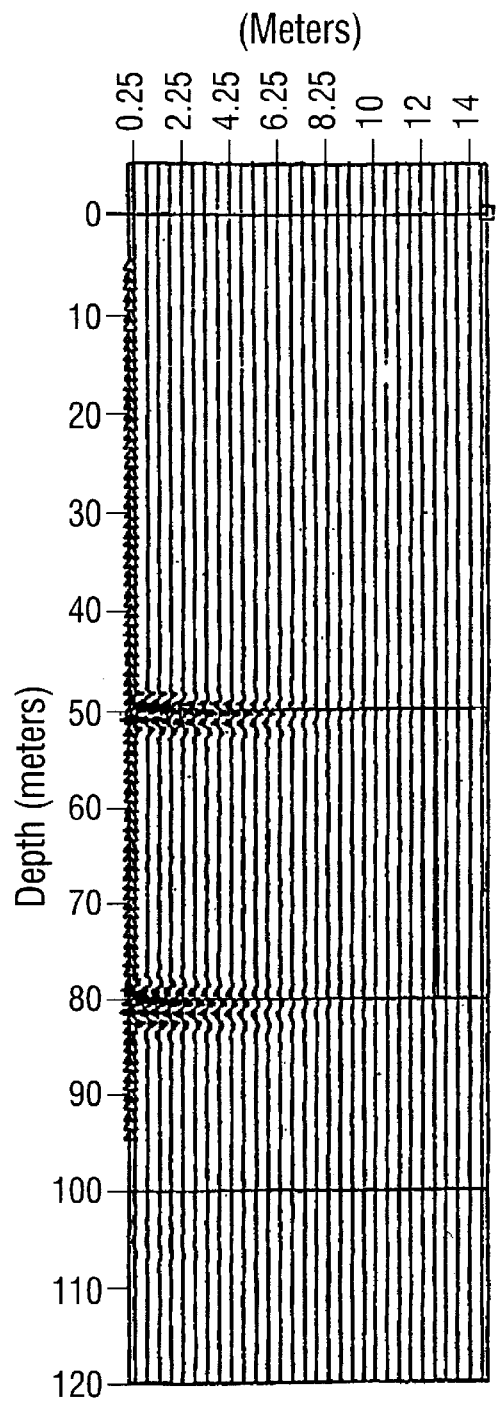
FIG. 28
(Prior Art)
FIG. 29
(Prior Art)

METHOD AND APPARATUS FOR SEISMICALLY SURVEYING AN EARTH FORMATION IN RELATION TO A BOREHOLE

BACKGROUND OF INVENTION

1. Technical Field

The present invention relates to seismic sensing; and more particularly, to seismic surveying of an earth formation in relation to a borehole.

2. Description of Related Art

Seismic surveying is a standard tool for the exploration of hydrocarbon reservoirs. Traditional seismic surveys have been consistently performed using geophones and hydrophones. Geophones measure the earth media's particle displacement or particle velocity, while hydrophones measure the fluid pressure changes due to a remote source in boreholes or in a marine environment. The seismic geophones and/or hydrophones are typically temporarily deployed along the earth's surface or along the ocean bottom to perform surface seismic surveys, or in a borehole to perform vertical seismic profiles, or cross-well seismic measurements.

An alternative seismic surveying tool is disclosed in commonly assigned U.S. patent application Ser. No. 08/800,208, Fiber Optic Bragg Grating Sensor System for Use in Vertical Seismic Profiling, filed Feb. 12, 1997, the contents of which is incorporated herein in its entirety. The invention disclosed in the '208 application comprises a fiber optic sensor positioned within a fluid filled metal capillary tube. The capillary tube is lowered inside of a borehole wherein the sensor is responsive to strain on the capillary tube, through the incompressible fluid, caused by acoustic pressure associated with a seismic pressure wave. Like the prior art described herein above the '208 fiber optic sensor is described as being temporarily deployed in a borehole to perform vertical seismic profiles. Further, the '208 sensor measures the strain response of the capillary tube to a seismic event in relation to the borehole, and therefore the earth formation, and does not measure the response of the earth formation directly.

These prior art seismic surveys are optimized for short term exploration and production objectives but can be quite costly, especially when well production needs to be shut down for the measurements, or a large area needs to be explored, or the surveys need to be repeated to monitor reservoir changes over time. There is a need for a new approach to acquire direct earth formation seismic wave data because of the extensive and repeated use of surface, ocean bottom, and in-well seismic techniques to image and monitor earth formations and reservoirs.

SUMMARY OF INVENTION

The present invention provides a new and unique method and apparatus for performing a seismic survey of an earth formation.

The seismic survey method includes arranging at least one combined strain seismic sensor and borehole structure having a strain sensor arranged therein into the borehole; providing a seismic disturbance in relation to the borehole; receiving a combined strain seismic sensor and borehole structure signal containing information about the seismic disturbance in relation to the borehole; and providing seismic survey information about the earth formation in relation to the borehole depending on the information contained in the optical seismic sensor and borehole structure signal.

The combined strain seismic sensor and borehole structure may include one or more optical seismic sensors in combination with one or more borehole structures, including either a flexible carrier film having the optical fiber arranged therein or thereon, or either coiled tubing, a production tube or a well casing having the optical fiber wrapped therein or thereabout, or a combination thereof wherein the combination is closely coupled to the earth formation. The flexible carrier film may be deposed in or on a packer/bladder, or other type of coupling mechanism, arranged between the production tube and the well casing also in the borehole.

The optical fiber may have a Fiber Bragg Grating sensor therein for sensing the seismic disturbance. The Bragg grating sensor may include either a Bragg grating point sensor, multiple Bragg gratings, or a lasing element formed with pairs of multiple Bragg gratings. Based on the principle of Fiber Bragg Grating sensors, these sensors can be made to measure the deformation of the earth formation over the length of a Fiber Bragg Grating sensor. To put it precisely, a Fiber Bragg Grating sensor directly measures the strain of the earth material at the sensor location. This provides new ways to perform seismic surveying using strain measurements.

Strain seismic data, as acquired by a Fiber Bragg Grating sensor array, can yield the same information as traditional geophone data when used for seismic image processing. Based on similar principles, optical fiber without Fiber Bragg Gratings, can also be used to measure the deformation of the earth formation over the optical fiber depending on the change of length of the optical fiber. In effect, the techniques for sensing the changes in the length of the optical fiber as a function of the seismic disturbance may be done with or without the use of a Fiber Bragg Grating in the optical fiber. When using a Bragg Grating sensor, the change of length of the optical fiber may cause a strain induced shift ($\Delta\lambda$) in the Bragg Grating sensor that causes a change in an optical parameter which is sensed by a light source, detection measurement and signal processor device. In the case of an interferometer based sensor, the change in length ($\Delta l$) of the optical fiber produces a time of flight change which is sensed by a light source, detection measurement and signal processor device.

The optical fiber may be arranged in a hoop strain fiber loop (horizontal), an axial strain fiber loop (vertical), an oblique loop (angled), or any combination thereof, on or in the flexible carrier film, the coiled tubing, the production tube, the well casing, or a combination thereof, for sensing the seismic disturbance in relation to the axis of the borehole. In effect, the seismic disturbance results in strain in the earth formation that is coupled to the flexible carrier film, the coiled tubing, the production tube, the well casing, or the combination thereof at some appropriate angle.

The optical fiber sensors may be configured using any type of optical grating-based measurement technique, e.g., scanning interferometric, scanning Fabry Perot, acousto-optic tuned filter, time of flight, etc. having sufficient sensitivity to measure the strain response of the borehole structure in terms of changes in the length of the optical fiber as a function of the seismic disturbance.

The seismic survey apparatus features the light source, detection measurement and signal processor device in combination with the combined optical seismic sensor and borehole structure, which cooperate as follows:

The light source, detection measurement and signal processor device provides the optical signal to the combined optical seismic sensor and borehole structure. The light source, detection measurement and signal processor device responds to the combined optical seismic sensor and borehole structure signal from the combined optical seismic sensor and borehole structure, for providing seismic survey information about the earth formation in relation to the borehole depending on the information contained in the combined optical seismic sensor and borehole structure signal.

The combined optical seismic and borehole structure sensor responds to the optical signal from the light source, detection measurement and signal processor device, and also responds to a seismic disturbance in relation to the earth formation, for providing the combined optical seismic sensor and borehole structure signal to the light source, detection measurement and signal processor device. The combined optical seismic sensor and borehole structure signal contains information about the seismic disturbance in relation to the borehole and earth formation.

One advantage of the present invention is that seismic sensors can be permanently implanted in the borehole to allow seismic imaging/monitoring over time. Another advantage is that the seismic sensors are coupled to the earth formation and measure the direct strain response of the earth formation to a seismic event. Yet another advantage is that a large number of seismic sensors can be deployed to allow high resolution measurement and effective data processing, and also can be designed to be low profile, which minimizes the additional space occupied by the seismic sensor.

The foregoing and other objects, features and advantages of the present invention will become more apparent in light of the following detailed description of exemplary embodiments thereof, as illustrated in the accompanying drawings.

BRIEF DESCRIPTION OF THE DRAWINGS

FIG. 12 is a diagram of a Bragg Grating Sensor of the prior art.

FIG. 13 is a graph of an input spectrum of a Bragg Grating Sensor of the prior art.

FIG. 14 is a graph of a transmitted spectrum of a Bragg Grating Sensor of the prior art.

FIG. 15 is a graph of a reflected spectrum of a Bragg Grating Sensor of the prior art.

FIG. 16 is an equation to determine a strain induced shift (Δλ) of a Bragg Grating Sensor of the prior art.

FIG. 22 is a graph of a velocity (meters/second) versus depth (meters).

FIG. 23 is a graph of a CDP transform showing a depth (meters) versus an offset (meters) from the well.

FIG. 24 is a graph of velocity (meters/second) versus depth (meters).

FIG. 25 is a graph of a CDP transform showing a depth (meters) versus an offset (meters) from the well.

FIG. 28 is a graph of a VSP migration using pressure data showing a depth (meters) versus an offset (meters) from the well.

FIG. 29 is a graph of a VSP migration using axial particle velocity data showing a depth (meters) versus an offset (meters) from the well.

DETAILED DESCRIPTION OF THE INVENTION

Figure 1:
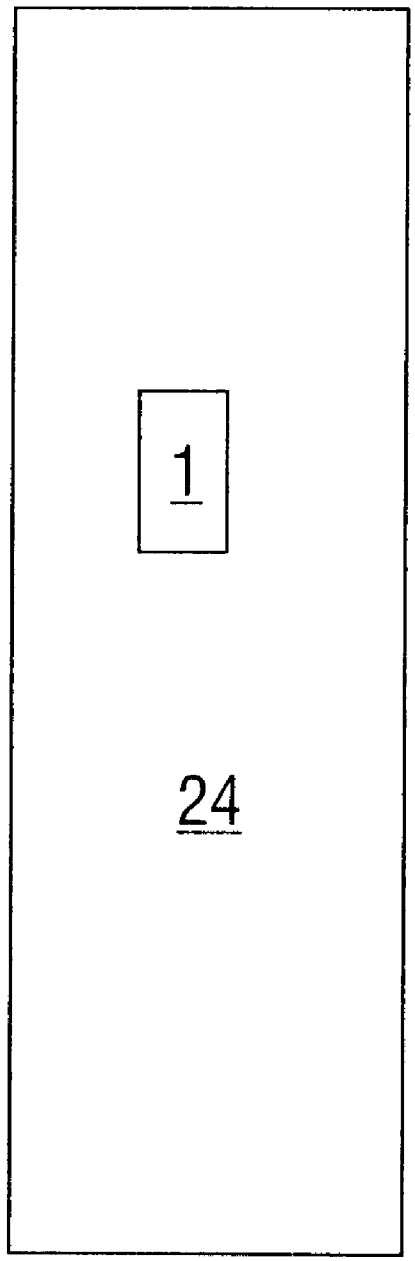
FIG. 1 is a block diagram of a strain seismic sensor that is the subject matter of the present invention.

FIG. 1 shows a new and unique strain seismic sensor 1 described herein that includes any type of strain sensor such as piezoelectric, optical, capacitive, piezo-resistive (e.g., Wheatstone bridge), etc, capable of measuring the strain response of a borehole structure 24, to a seismic disturbance. If optical strain sensors are used, the sensor 1 may be Bragg grating based strain sensor, such as that described in great detail herein below. Alternatively, the strain sensor 1 may be electrical or optical strain gages attached to or embedded in the borehole structure to measure the strain response of the borehole structure to a seismic event. In an embodiment of the present invention that utilizes fiber optics as the strain sensor 1, an array of such sensors may be utilized and they may be connected individually or may be multiplexed along one or more optical fibers using wavelength division multiplexing (WDM), time division multiplexing (TDM), or any other optical multiplexing techniques (discussed more hereinafter).

Figure 2:
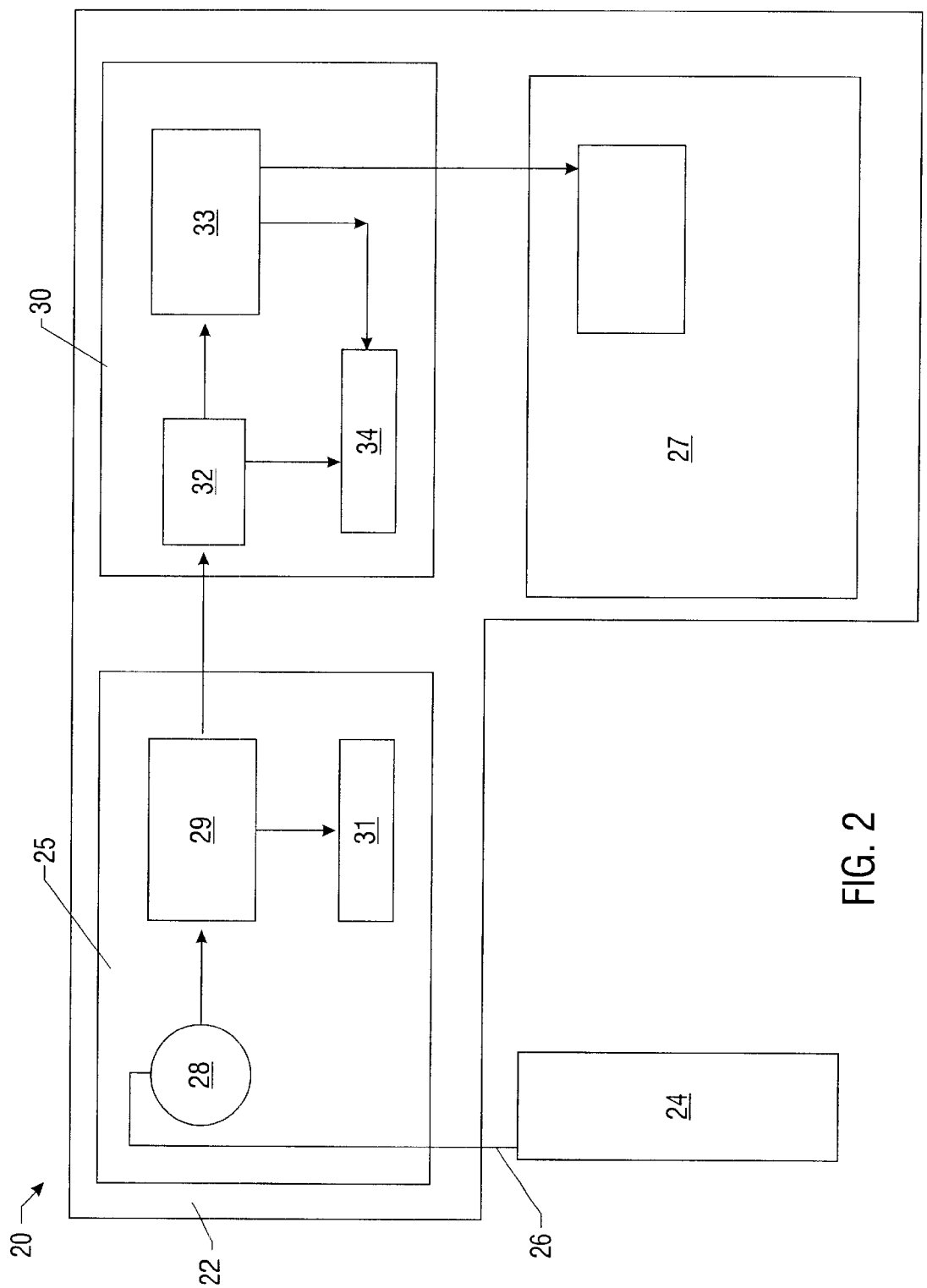
FIG. 2 is a block diagram of a seismic survey apparatus that is the subject matter of the present invention.

FIG. 2 shows a new and unique seismic survey system generally indicated as 20 for performing a seismic survey of an earth formation in relation to a borehole 40 and earth formation 60 (see FIG. 4), featuring a light source, detection measurement and signal processor device 22 in combination with at least one combined optical seismic sensor and borehole structure 24. The combined optical seismic sensor and borehole structure 24 may be in the form of either a flexible carrier film having an optical fiber arranged therein or thereon, or either a coiled tubing, a production tube or a well casing having an optical fiber wrapped therein or thereabout, or a combination thereof, described in detail herein below with reference to FIG. 5. Moreover, the seismic surveying in general is discussed herein below in relation to FIG. 4, and the earth formation and the borehole are discussed in relation to FIGS. 5, 9 and 10.

Figure 3:
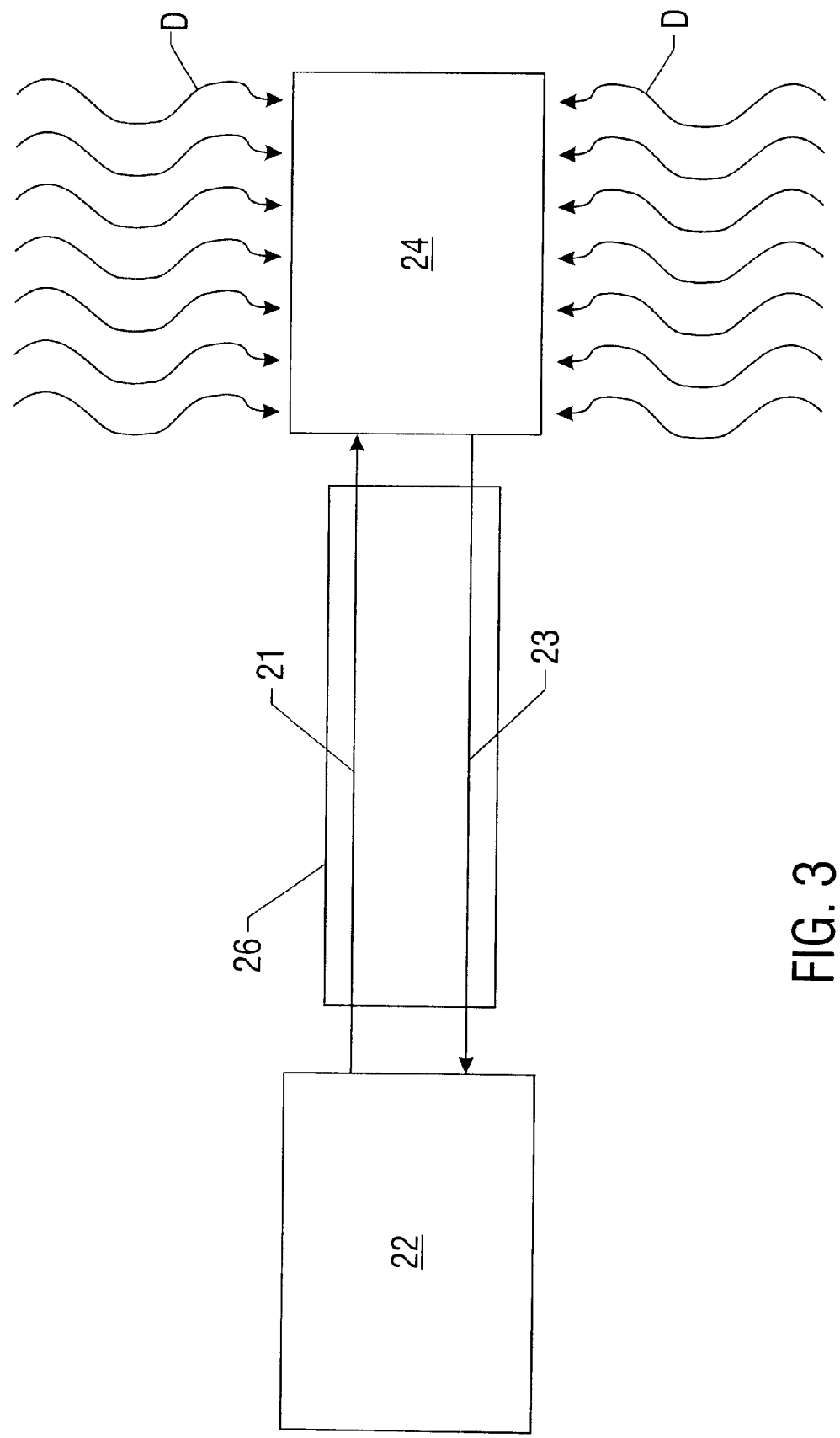
FIG. 3 is a block diagram of a light source, detection measurement and signal processor device that is part of the seismic survey apparatus.

Referring to FIG. 3, the light source, detection measurement and signal processor device 22 provides an optical signal represented by 21 to the combined optical seismic sensor and borehole structure 24. The light source, detection measurement and signal processor device 22 responds to an optical seismic sensor signal represented by 23 from the combined optical seismic sensor and borehole structure 24, for providing seismic survey information about the earth formation in relation to the borehole depending on the information contained in the combined optical seismic sensor and borehole structure signal. The combined optical seismic sensor and borehole structure signal may comprise flexible carrier film, coiled tubing, production tube or well casing optical seismic sensor.

Figure 4:
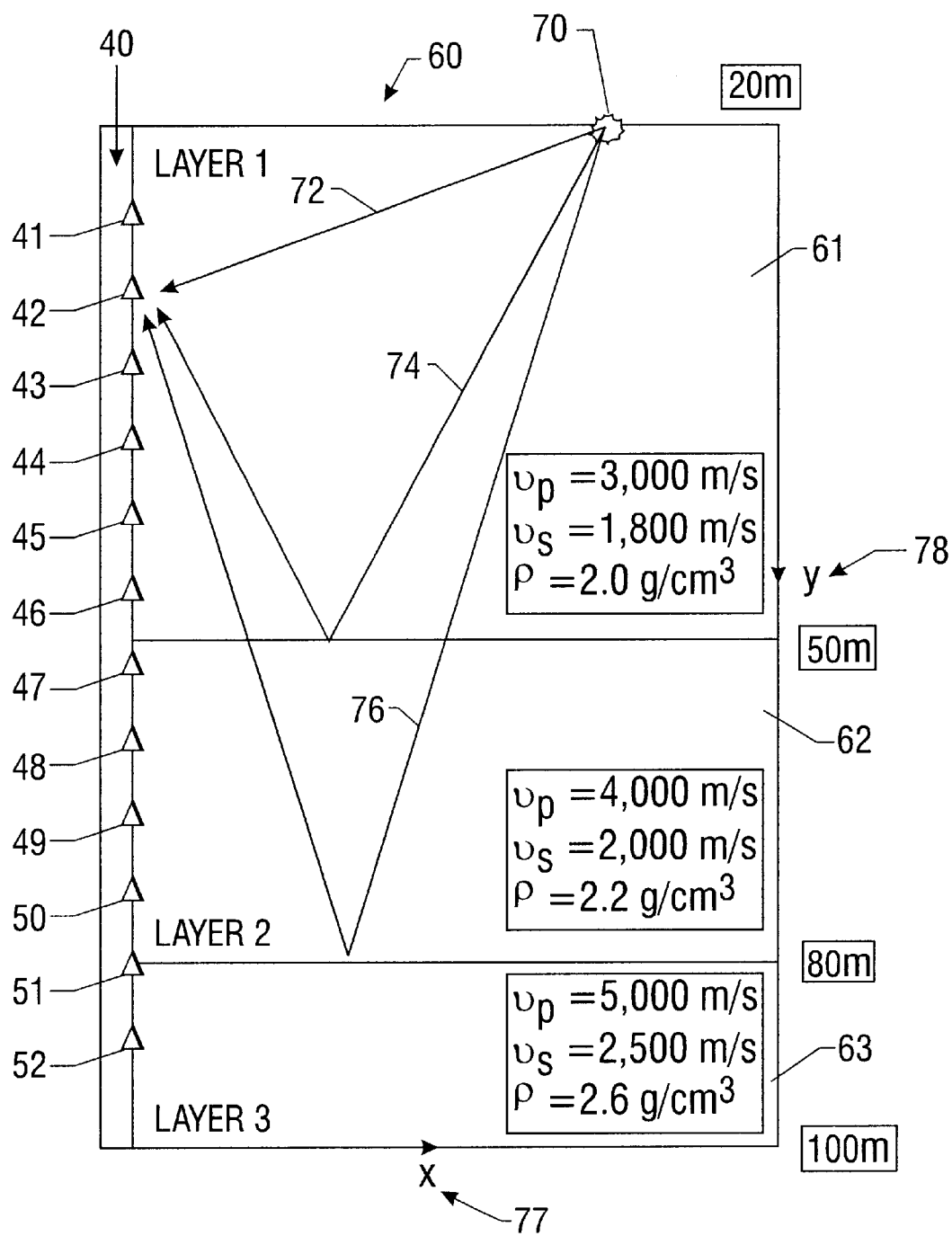
FIG. 4 is a diagram of a two-dimensional finite difference model for geophone and strain seismic wave simulation.

The combined optical seismic sensor and borehole structure 24 is arranged in the borehole 40 within earth formation 60 (see FIG. 4). The combined optical seismic sensor and borehole structure 24 is closely coupled to the earth formation and reacts substantially as a contiguous portion of the formation. The combined optical seismic sensor and borehole structure 24, responds to the optical signal from the light source, detection measurement and signal processor device 22, and also responds to a seismic disturbance D in relation to the borehole 40 and earth formation 60, for providing the combined optical seismic sensor and borehole structure signal. The combined optical seismic sensor and borehole structure signal to the light source, detection measurement and signal processor device 22 contains information about the seismic disturbance in relation to the borehole 40 and earth formation 60. The seismic disturbance information may be used to determine information about the earth formation surrounding the borehole.

The combined optical seismic sensor and borehole structure 24 may include an optical fiber with or without a Fiber Bragg Grating sensor therein, as discussed in more detail below. The Fiber Bragg Grating sensor may include either a Bragg grating point sensor, multiple Bragg gratings, or a lasing element formed with pairs of multiple Bragg gratings.

The optical signal and the combined optical seismic sensor and borehole structure signal are communicated between the light source, detection measurement and signal processor device 22 and the combined optical seismic sensor and borehole structure 24 via a transmission cable generally indicated as 26 (see also FIGS. 2 and 3), which is well known in the art.

The light source, detection measurement and signal processor device 22 is known in the art and generally includes three basic components—a light source device, a light detection measurement device and a signal processor device. Examples of a typical light source device, a typical light detection measurement device, and a typical signal processor device are included in the patents listed hereinbelow. The signal processor device can be implemented using computer hardware, computer software, or a combination thereof, and a typical microprocessor-based architecture would include a microprocessor, RAM, ROM, an input/output device, and an address, data and control bus connecting the same. The light source, detection measurement and signal processor device 22 is designed to implement any optical grating-based measurement technique, as discussed below. The scope of the invention is not intended to be limited to any particular design of the light source, detection measurement and signal processor device 22.

FIG. 2 is provided by way of example and shows a fiber optic in-well seismic system basic configuration. The fiber optic in-well seismic system basic configuration includes the combined optical seismic sensor and borehole structure 24 in the form of an in-well optical seismic sensor array, as well as the transmission cable 26, consistent with that shown in FIG. 3.

Moreover, the fiber optic in-well seismic system basic configuration also includes the basic components of the light source, detection measurement and signal processor device 22 shown in FIG. 3 in the form of an electro-optics in-well seismic system generally indicated as 25, a seismic data recording, quality control (QC) and pre-processing system generally indicated as 30 and a data processing system 27.

The electro-optics in-well seismic system 25 is shown as including a conveyance system 28, an electro-optics system 29, and data storage device 31.

The seismic data recording, QC and pre-processing system 30 includes a seismic data recording system and peripheral control 32, a seismic wellsite data QC and pre-processing system 33, and a data storage 34. The seismic wellsite data QC and pre-processing system 33 has software programs for providing wellsite data products.

The data processing system 27 is shown as an offsite data processing system and has software programs for providing offsite data products.

The aforementioned basic components are known in the art, and a person skilled in the art would appreciate without undue experimentation how to adapt the same to cooperate with the optical seismic sensor 24 to implement the invention described in the instant patent application. In addition, the scope of the invention is not intended to be limited to where the seismic data in the fiber optic in-well seismic system basic configuration of FIG. 2 is processed, i.e. either on or off the wellsite.

FIG. 4 shows an example of a two-dimensional finite difference model for geophone and strain seismic wave simulation. The two-dimensional finite difference model includes a borehole generally indicated as 40 and twelve optical seismic sensors 41, 42, 43, 44, 45, 46, 47, 48, 49, 50, 51, 52 arranged therein at various depths shown on the left side of the model from 20 m to 100 m. The optical seismic sensor 24 shown and described with respect to FIG. 1 may include one or more of the optical seismic sensors 41–52. The details concerning the optical seismic sensors 41–52 are discussed below in relation to FIGS. 5 through 16.

As is known, earth formation 60 is stratified into layers with each layer having different characteristics such as pressure wave velocity ($v_p$), shear wave velocity ($v_s$), and average density (ρ). In the example in FIG. 4, the borehole 40 is surrounded by an earth formation 60 having three layers indicated as Layer 1 61, Layer 2 62, Layer 3 63. In this particular example, Layer 1 has the following parameters: $v_p$=3,000 m/s, $v_s$=1,800 m/s and ρ=2.0 grams/centimeter$^3$; Layer 2 has the following parameters: $v_p$=4,000 m/s, $v_s$=2,000 m/s and ρ=2.2 g/cm$^3$; and Layer 3 has the following parameters: $v_s$=2,500 m/s and ρ=2.6 g/cm$^3$. The well fluid velocity is 1,5000 m/s and the well radius is 0.1 meters. The seismic disturbance source is generally indicated as 70, and the seismic waves are generally indicated as 72, 74, 76, with seismic wave 74 reflecting off a boundary between Layer 1 and Layer 2, and with seismic wave 76 reflecting off a boundary between Layer 2 and Layer 3. The optical seismic sensors 41–52 and borehole 40 are closely coupled to and considered to be a contiguous part of the earth formation 60. The two-dimensional finite difference model and the results are discussed in greater detail herein below.

Figure 5:
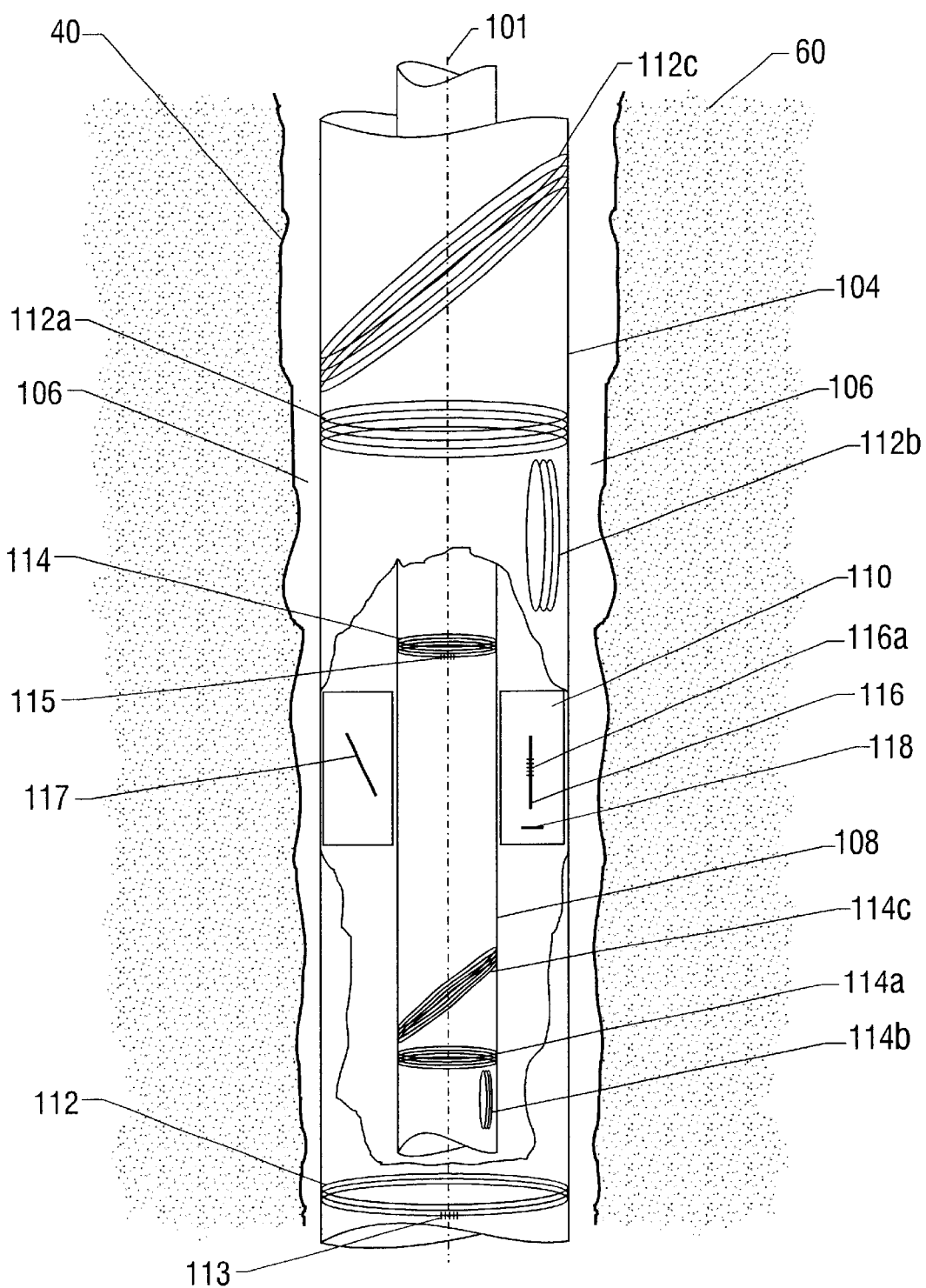
FIG. 5 is a diagram of a borehole having optical seismic sensors arranged therein.

FIG. 5 shows a diagram of a borehole generally indicated as 40, and is surrounded by an earth formation generally indicated as 60. The borehole 40 has borehole structures arranged therein, including a well casing 104, a coiled tubing 105 (not shown), a production tube 108 and a combination of a flexible carrier film and packer/bladder 110. The well casing 104 is arranged in the borehole 40 and has a cement or other appropriate material 106 for coupling the well casing 104 to the earth formation 60. The production tube 108 is arranged inside the well casing 104. The coiled tubing 105 can be arranged inside the casing 104 between the well casing 104 and the production tubing 108. The coiled tubing 105 is known in the art and may by used to provide instrumentation into the borehole 40. In other applications, the coiled tubing 105 may also be used to drill a borehole. The combination of a flexible carrier film and packer/bladder 110 is arranged inside the borehole 40 between the well casing 104 and the production tube 108.

The invention may include any one or more strain seismic sensors (similar to sensor 41–52 of FIG. 4) having one or more placements closely coupled to one or more borehole structures which are in turn closely coupled to the earth formation 60. FIG. 5 shows by way of example different strain seismic sensors having different placement in different borehole structures.

A first optical seismic sensor arrangement includes optical fibers 112, 112a, 112b, 112c wrapped in relation to the axis 101 of the well casing 104 and closely mechanically coupled thereto. As shown, the optical fiber 112 is wrapped around the outside of the well casing 104 and perpendicular to the axis 101 of the well casing 104. The optical fiber 112a is wrapped around the inside of the well casing 104 and perpendicular to the axis 101 of the well casing 104. The optical fiber 112b is wrapped inside the material of the well casing 104 and parallel to the axis of the well casing 104. The optical fiber 112c is wrapped around the outside of the well casing 104 at an oblique angle relative to the axis 101 of the well casing 104. Although not shown, the optical fiber 112c may also be wrapped either around the inside of the well casing 104, or wrapped and embedded inside the well casing 104, and oblique to the axis 101 of the well casing 104. The optical fiber 112 has a Fiber Bragg Grating 113 arranged therein. The optical fibers 112a, 112b, 112c may also have a Fiber Bragg Grating like 113 arranged therein.

A second optical seismic sensor arrangement has optical fibers 114, 114a, 114b, 114c wrapped in relation to the production tube 108 and closely mechanically coupled thereto. As shown, the optical fiber 114 is wrapped around the outside of the production tube 108 and perpendicular to the axis 101 of the production tube 108. The optical fiber 114a is wrapped around the inside of the production tube 108 and perpendicular to the axis 101 of the production tube 108. The optical fiber 114b is wrapped inside of the material of the production tube 108 and parallel to the axis 101 of the production tube 108. The optical fiber 114c is wrapped around the outside of the production tube 108 and oblique to the axis of the production tube 108. Although not shown, the optical fiber 114c may also be wrapped either around the inside of the production tube 108, or wrapped inside the material of the production tube 108 at an oblique angle relative to the axis 101 of the production tube 108. The optical fiber 114 has a Fiber Bragg Grating 115 arranged therein. The optical fibers 114a, 114b, 114c may also have a Fiber Bragg Grating like 115 arranged therein.

A third optical seismic sensor arrangement has optical fibers 116, 117, 118 arranged in or on the combination of the flexible carrier film and packer/bladder 110 in relation to the axis 101 of the borehole 40. The packer/bladder 110 provides positioning and mechanically coupling of the sensors to the borehole structure and earth formation. The optical fiber 116 is arranged vertically in relation to the axis 101 of the borehole 40. The optical fiber 117 is arranged obliquely in relation to the axis 101 of the borehole 40. The optical fiber 118 is arranged horizontally in relation to the axis of the borehole 40. The optical fiber 116 has a Fiber Bragg Grating 116a arranged therein. The optical fibers 117, 118 may also have a Fiber Bragg Grating like 116a arranged therein.

A fourth optical seismic sensor arrangement (not shown) has an optical fiber arranged inside, outside or therein the coiled tubing 105 in relation to the axis 101 of the borehole 40 and is mechanically coupled to the earth formation by any known means such as cementing.

Still referring to FIG. 5, a non-optical strain gauge may be used as one or more of the strain seismic sensors 112, 112a, 112b, 112c, 114, 114a, 114b, 114c, 116, 117, and it may measure the seismic wave by measuring the strain response of the borehole structure similar to that described herein above for optics based strain seismic sensors. In general, the strain gages measure the structural response, deflection for example, in any direction of the borehole structure in response to a seismic event. The strain response measured at the location of the strain gauge local strain (axial strain, hoop strain or off axis strain), is caused by seismic waves (72, 74, 76 in FIG. 4), migrating passed the borehole structure. The amount of strain detected by the strain seismic sensor is dependent on the magnitude and direction of the wave, the coupling of the borehole structure to the earth formation and the coupling of the strain sensor to the borehole structure as well as the structural characteristics of the borehole structure itself.

Figure 6:
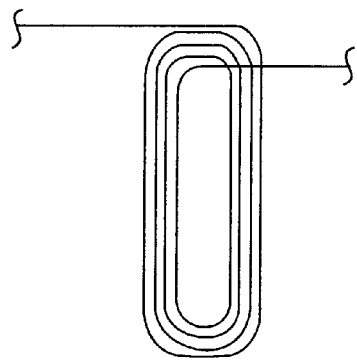
FIGS. 6, 7, 8 show various configurations for wrapping the fiber inside, outside or therein the borehole structure.
Figure 7:
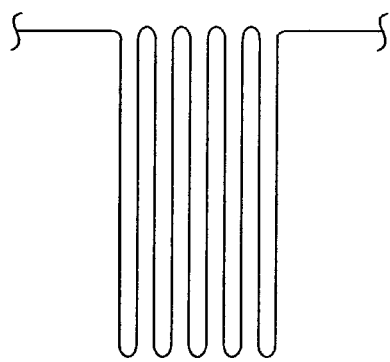
Figure 8:
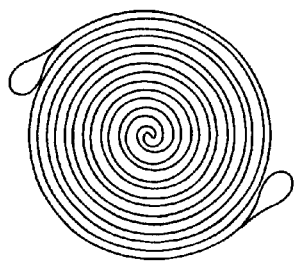

FIGS. 6, 7, 8 show by way of example different configurations for non-optical seismic strain sensors as well as configurations for wrapping the optical fiber inside, outside or therein the casing, coil tubing, production tubing or flexible film carrier, including a racetrack configuration in FIG. 6, a radiator configuration in FIG. 7, and a circular configuration in FIG. 8, as well as a coil not shown. The reader is referred by way of example to patent application Ser. No. 09/344,094, filed Jun. 25, 1999, for examples of fiber optic wrapping configurations. The scope of the invention is not intended to be limited to any particular configuration for wrapping the optical fiber.

The combined strain seismic sensor and borehole structure 24 shown and described above with respect to FIGS. 1, 2, 3 may include one or more of the aforementioned strain seismic sensor arrangements having one or more of the different placements in relation to one or more borehole structures. The scope of the invention is not intended to be limited to any particular number, placement, orientation or type of strain seismic sensor in relation to the casing, coiled tubing, production tube or the combination of the flexible carrier film and packer/bladder. The scope of the invention is also intended to include other borehole structures that are rigid enough to respond to a seismic disturbance to be sensed. In particular, the present invention encompasses the detection of the strain by strain seismic sensors of any structure that is closely coupled to an earth formation.

Figure 9:
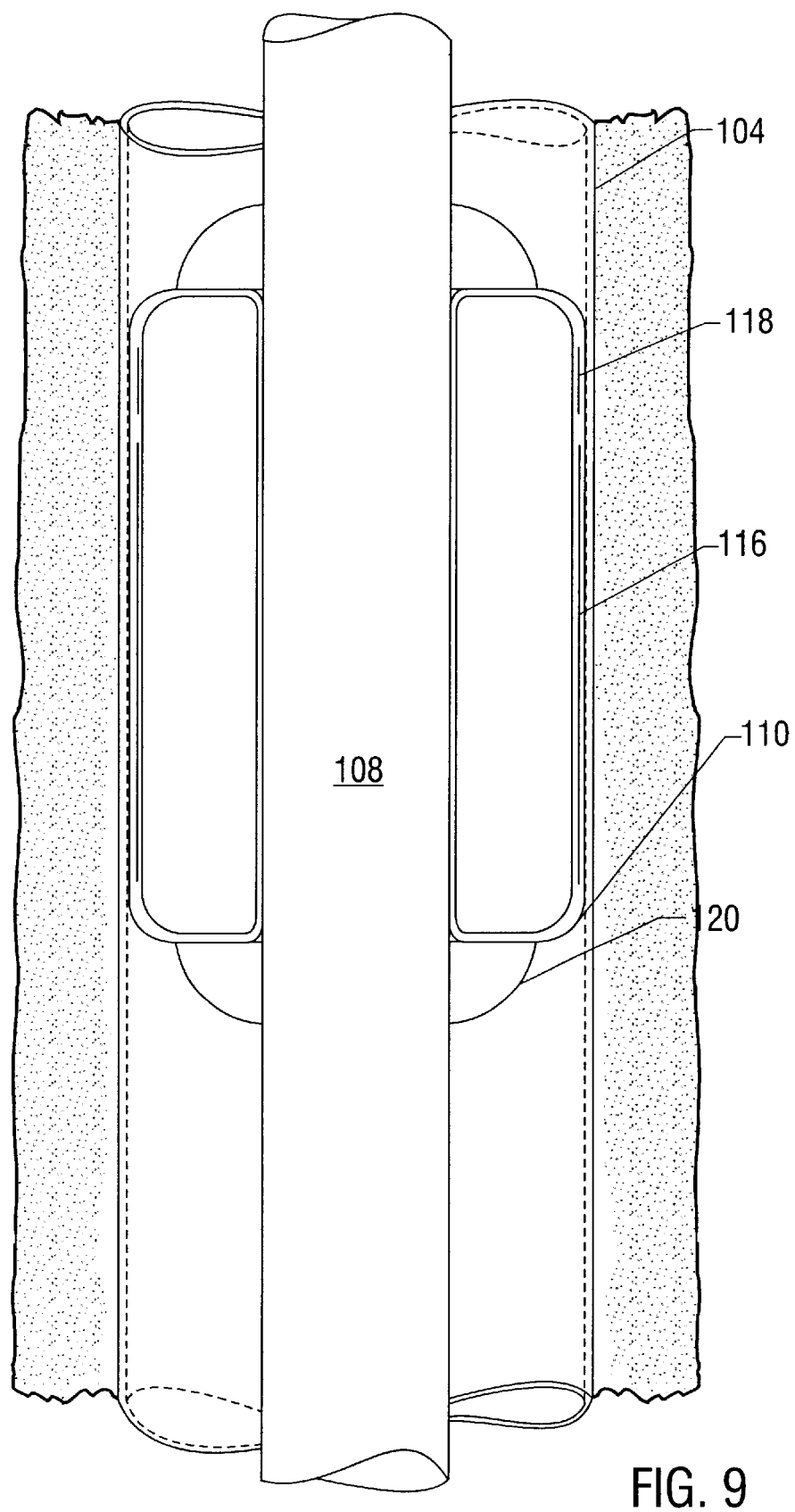
FIG. 9 is a diagram of optical seismic sensor in the form of a strain sensor having a packer/bladder inflated.
Figure 10:
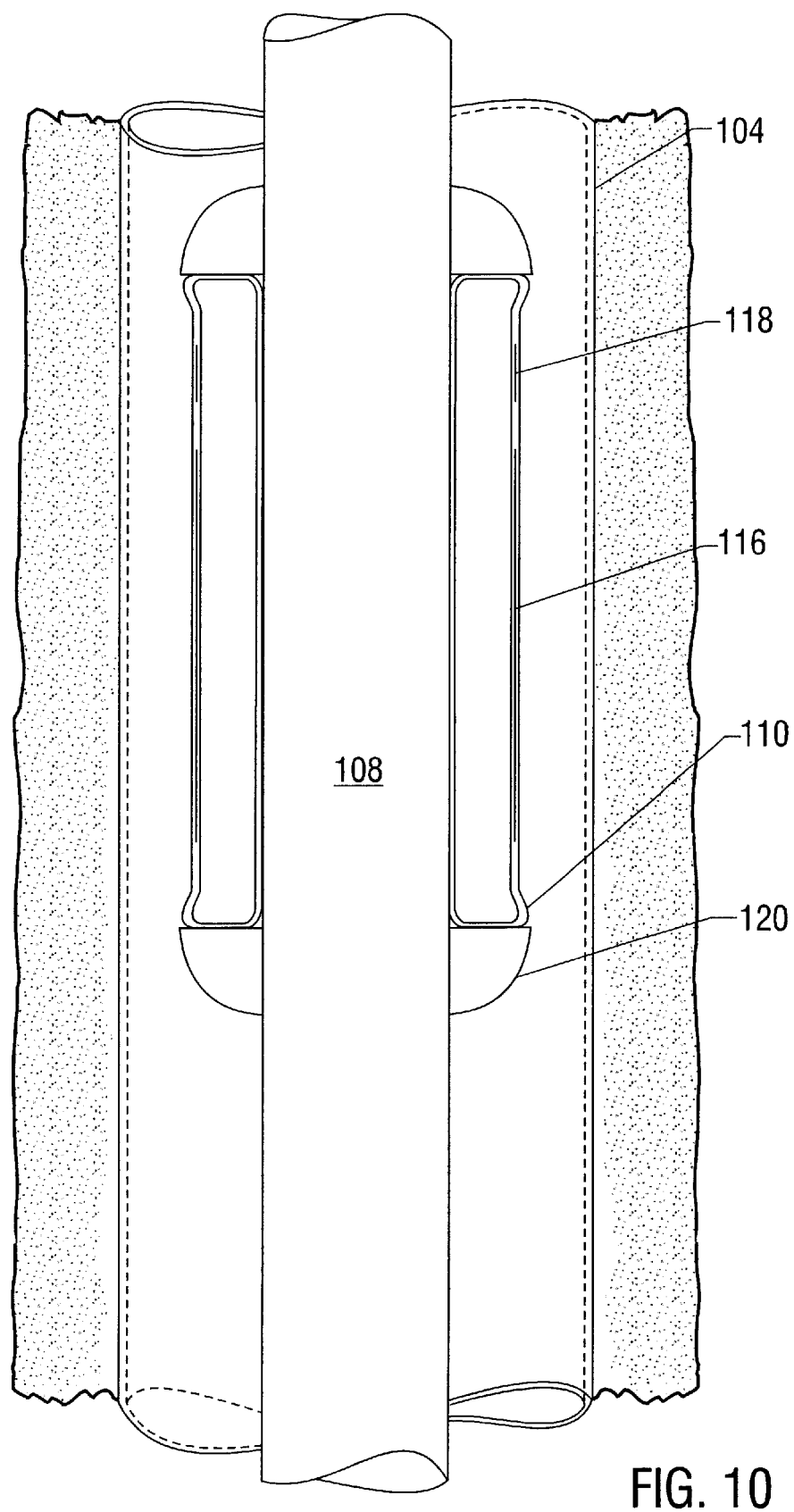
FIG. 10 is a diagram of the strain sensor in FIG. 9 having a bladder compressed.

FIGS. 9 and 10 respectively show a strain sensor having the combination of the flexible carrier film and packer/bladder 110 inflated and compressed. In FIGS. 9 and 10, the combination of the flexible carrier film and packer/bladder 110 is surrounded by a clamping ring 120 for retaining the combination of the flexible carrier film and packer/bladder 110. The operation of the inflation and compression of the combination of the flexible carrier film and packer/bladder 110 is known in the art. When the combination of the flexible carrier film and packer/bladder 110 is inflated against the well casing 104, the axial fiber 116 and the hoop fiber 118 are mechanically coupled to the earth formation and sense the strain in the borehole structure in response to the seismic disturbance. It is also within the scope of the present invention that the flexible carrier film and packer/bladder 110 of FIGS. 9 and 10 is inflated against an open hole in the earth, as is known, wherein the axial fiber 116 and the hoop fiber 118 are mechanically coupled to the earth formation and sense the strain in the borehole structure in response to the seismic disturbance.

Figure 11:
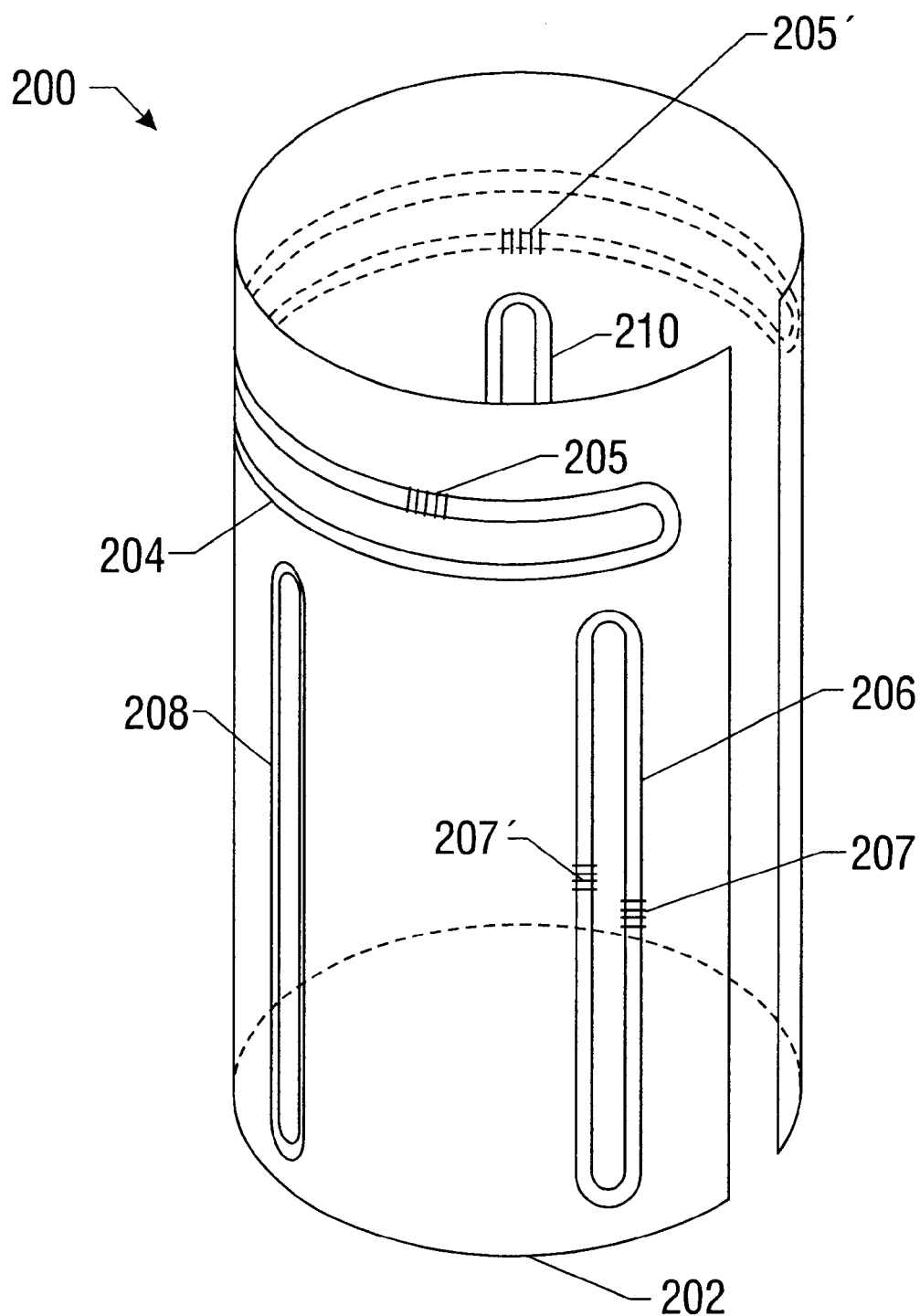
FIG. 11 is a diagram of an optical seismic sensor with optical fiber loops arranged on a flexible carrier.

FIG. 11 shows a strain seismic sensor generally indicated as 200 that includes a flexible carrier film 202 having one or more optical fibers 204, 206, 208, 210 arranged therein or thereon. Consistent with that discussed hereinabove, the flexible carrier film 202 may be a separate part arranged in relation to a packer/bladder or may form the combination of the flexible carrier film and packer/bladder 110 as in FIG. 5. As shown, the optical fiber 204 is wrapped in a hoop strain fiber loop perpendicular to an axis of the borehole, similar to the optical seismic sensor 118 in FIG. 5. The optical fiber 204 may have a Fiber Bragg Grating pair 205, 205' therein with a fiber loop in between. The optical fibers 206, 208, 210 are also wrapped in an axial strain fiber loop parallel to the axis of the borehole, similar to the optical seismic sensor 116 in FIG. 5. The optical fiber 206 may have a Fiber Bragg Grating pair 207, 207' therein with a fiber loop in between. In alternative embodiments the strain seismic sensors in of FIG. 11 may also comprise non-optic based strain sensors as described hereinabove.

FIG. 12 shows a Fiber Bragg Grating sensor 130 known in the art, and is also known as a Bragg Grating sensor, a Fiber Bragg Grating, etc. The Fiber Bragg Gratings 113, 115, 116a(FIG. 5) and 205, 207 (FIG. 11) are an example of the Bragg Grating sensor shown in FIG. 12. With reference to FIG. 11, each optical fiber 204, 206, 208, 210 is connected to the light source, detection measurement and signal processor device 22 (FIG. 2). With reference to FIGS. 12–16, in operation, Fiber Bragg Grating Sensor 130 responds to the input signal 131 provided from the light source, and further responds to the seismic disturbance in relation to the borehole, for providing an optical seismic sensor reflected signal 132 containing information about the seismic disturbance in relation to the strain of the borehole structure and earth formation. In the case where the Fiber Bragg Gratings 205, 207 are used, the change of length of the optical fiber 204, 206 of the strain seismic sensor may cause a strain induced shift 133 ($\Delta\lambda$) in the Bragg Grating sensor 205, 207 that causes a change in an optical parameter which is sensed by the light source, detection measurement and signal processor device 22 of FIG. 2.

Figure 17:
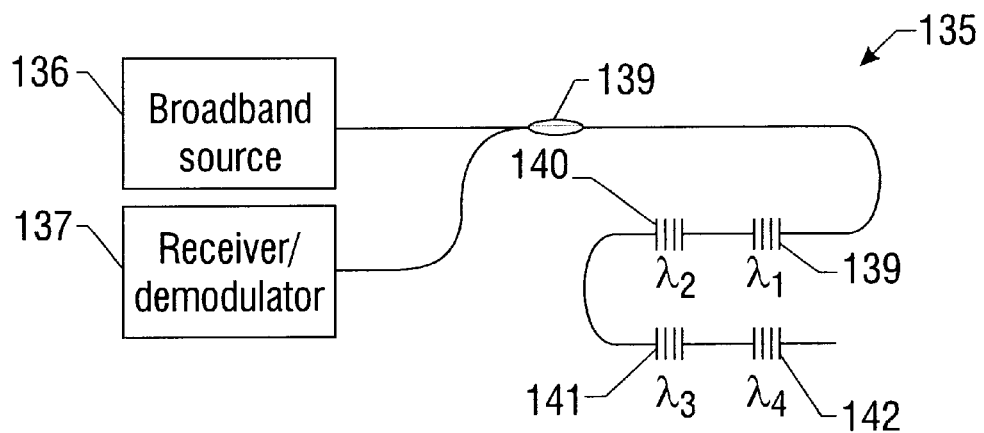
FIG. 17 shows a system that detects the strain in the gratings directly.
Figure 18:
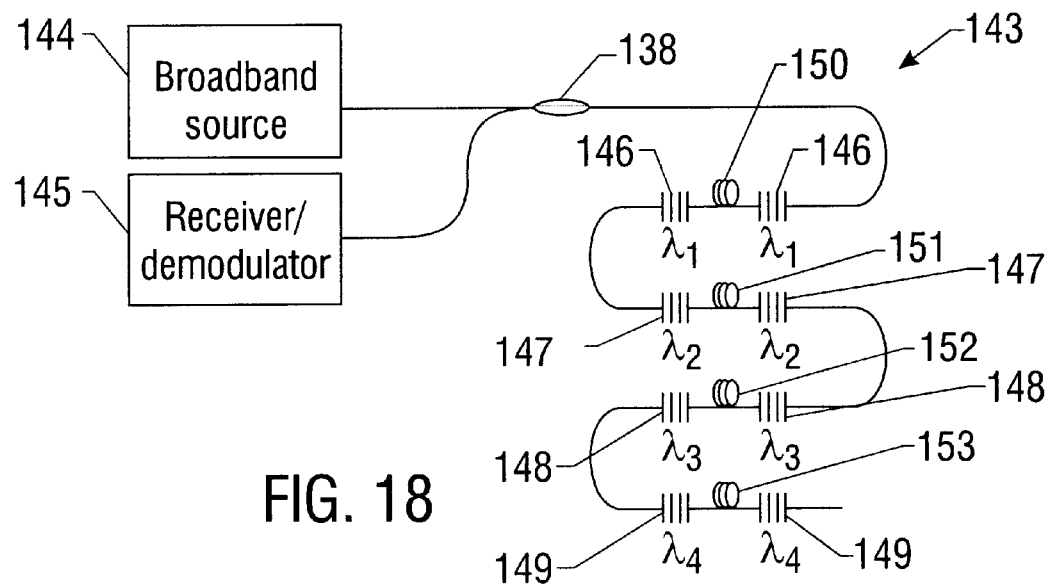
FIG. 18 shows a system that detects the strain in the fiber length between two gratings reflecting the same wavelength.

FIGS. 17 and 18 show two types of dynamic strain detection systems using the Fiber Bragg Gratings described hereinabove. FIG. 17 shows a system 135 that detects the strain in the gratings directly using a broadband source 136, a receiver/demodulator 137, a coupler 138 and sensors 139, 140, 141, 142 having Fiber Bragg Gratings with separate respective wavelengths. FIG. 18 shows a system 143 that detects the strain in the fiber length between pairs of Fiber Bragg Gratings 146, 147, 148, 149, with each pair reflecting the same wavelength using a tunable laser 144, a receiver/demodulator 145, a coupler 138. The pairs of Fiber Bragg Gratings 146–149 comprise sensors 150, 151, 152, 153.

In general, the optics based strain seismic sensors of the present invention may be configured in numerous known ways to precisely measure the fiber length or change in fiber length, such as an interferometric, Fabry Perot, time-of-flight, or other known arrangements. An example of a Fabry Perot technique is described in U.S. Pat. No. 4,950,883, entitled "Fiber Optic Sensor Arrangement Having Reflective Gratings Responsive to Particular Wavelengths," to Glenn, which is incorporated herein by reference. One example of time-off-light (or Time-Division-Multiplexing; TDM) would be where an optical pulse having a wavelength is launched down the optical fiber and a series of optical pulses are reflected back along the optical fiber. The length of each wrap can then be determined by the time delay between each return pulse.

Alternatively, a portion or all of the optical fiber between the Fiber Bragg Gratings (or including the gratings, or the entire fiber, if desired) may be doped with a rare earth dopant (such as erbium) to create a tunable fiber laser, such as is described in U.S. Pat. No. 5,317,576, entitled "Continuously Tunable Single Mode Rare-Earth Doped Laser Arrangement," to Ball et al., or U.S. Pat. No. 5,513,913, "Active Multipoint Fiber Laser Sensor," to Ball et al., or U.S. Pat. No. 5,564,832, "Birefringent Active Fiber Laser Sensor," to Ball et al., which are incorporated herein by reference.

In summary, the optics based strain seismic sensors of the present invention can be configured using any type of optical grating-based measurement technique, e.g., scanning interferometric, scanning Fabry Perot, acousto-optic tuned filter, time of flight, etc. having sufficient sensitivity to measure the changes in the length of the optical fiber as a function of the disturbance, such as that also described in one or more of the following references: A. Kersey et al., "Multiplexed fiber Bragg grating strain-sensor system with a Fabry-Perot wavelength filter," Opt. Letters, Vol. 18, No. 16, August 1993; U.S. Pat. No. 5,493,390, issued Feb. 20, 1996 to Mauro Verasi, et al.; U.S. Pat. No. 5,317,576, issued May 31, 1994 to Ball et al.; U.S. Pat. No. 5,426,297, issued Jun. 20, 1995 to Dunphy et al.; U.S. Pat. No. 5,401,956, issued Mar. 28, 1995 to Dunphy et al.; U.S. Pat. No. 4,996,419, issued Feb. 26, 1991 to Morey, which are all also hereby incorporated herein by reference in their entirety. The aforementioned techniques known in the art for sensing the changes in the length of the optical fiber as a function of the disturbance may be done with or without the use of a Fiber Bragg Grating in the optical fiber. A person skilled in the art would appreciate how to design the light source, detection measurement and signal processor device 22 to implement the type of optical grating-based measurement technique, as discussed hereinbelow.

An optical seismic sensing approach using strain seismic array sensors with a FiberBragg-Grating (FBG) technique is discussed with reference first to FIGS. 12, 13, 14, 15, 16 which show the operation principle of the Fiber Bragg Grating sensor 130. The Fiber Bragg Grating (FBG) 155 is an intrinsic sensor element that can be "written" into optical fibers via a UV photo-inscription process. The photo-inscription process produces a periodic modulation in the index of the glass in the fiber, which has been shown to be a stable structure even at elevated temperatures experienced downhole. The fiber grating exhibits a reflection spectrum that is extremely narrow and well defined. As shown in FIGS. 12, 13, 14, 15, 16, when light 131 from a source producing a wide range of optical wavelengths is passed down an optical fiber containing a Fiber Bragg Grating 155, all light, apart from a narrow "slice" of the spectrum $\lambda_B$, is transmitted through the optical fiber as the transmitted signal 156. The narrow slice of the light removed from the transmitted signal 156 is reflected back towards the source as the reflected signal 132. If the optical fiber is strained in the vicinity of the Fiber Bragg Grating by an external source (e.g. a seismic wave pressure propagating in the material), the reflected component 132 shifts to a different wavelength 133 as shown in FIG. 15. Monitoring the wavelength of the light off a grating element thus provides a measure of the fiber strain at the grating location.

As discussed hereinabove, the borehole structure, when efficiently mechanically coupled to the earth, reacts to seismic waves in a manner consistent with the earth formation itself. Based on the principle of strain seismic sensors discussed hereinabove, the present invention makes use of these sensors to measure the deformation of an earth formation over the length of the strain gauge or Fiber Bragg Grating sensor. To put it precisely, a strain seismic sensor of the present invention directly measures the strain of the earth material at the sensor location by measuring the strain response of the borehole structure to which it is coupled and which is itself closely coupled to the earth. This invention provides new ways to perform seismic surveying using strain measurements. Specifically, strain seismic data, as acquired by a strain seismic sensor array, can yield the same information as traditional geophone data when used for seismic image processing.

Referring again to FIG. 4, for a homogeneous earth formation, say Layer 1 generally shown as 61, the equivalence between strain seismic wave data of the present invention and the seismic displacement or velocity or pressure data of the prior art can be demonstrated using a simple example. Assume that a seismic displacement (U) wave 72 in such a formation is given by $$U = \vec{u}(kx - \omega t) \tag{1}$$

For a compressional wave, k is the wave number in X direction designated by 77; x is the wave travel distance along x-direction 77 from the origin; ω is the angular frequency of the wave; and t is time.

The seismic particle velocity (V) is given by the time derivative of the displacement:

$$V = \frac{\partial U}{\partial t} = -\omega \vec{u}'(kx - \omega t) \tag{2}$$

The seismic strain (ε) due to a compressional wave is the spatial derivative of the particle displacement, which is given by $$\varepsilon = \frac{\partial U}{\partial x} = k\vec{u}'(kx - \omega t) \tag{3}$$

Comparing Equations (2) and (3), a similarity is shown between the waveforms of the strain and the particle velocity in that they are both proportional to u' (kx−ωt). The significance of the comparison means that these two types of measurements, the strain measurement as enabled by the present invention and the particle velocity of the prior art, carry the same information in terms of frequency, wavelength, wave amplitudes, and propagation velocity.

As is known, a seismic event, such as an explosion, causes pressure waves and shear waves to travel through the earth formations. A structure that is closely coupled to the earth will experience the seismic event and will exhibit a strain response thereto. It is the strain response that the present invention detects from which is extracted seismic imaging data. In a true earth formation which is generally inhomogeneous and contains various structures (e.g. stratigraphic layers 61, 62, 63 in FIG. 4) that are the target of seismic imaging, the effectiveness of the strain seismic data compared to seismic displacement and/or velocity data of the prior art needs to be demonstrated with more sophisticated numerical modeling techniques. In accordance with the present invention, a finite difference simulation is used to achieve this goal.

As described hereinabove, FIG. 4 shows an earth model 60 used for the finite difference simulation of an offset vertical seismic survey. The model 60 is assumed to measure 20 meters in the X direction 77 by 100 meters in the Y direction 78 and represents one quadrant of a stratigraphic layered earth formation 60. The formation 60 consists of three layers 61, 62, 63 and the layer thickness, elastic properties, and the seismic source 70 location, etc., are described above. The borehole 40 is vertical with a radius of 0.1 meters, and the borehole fluid is water with assumed properties of $v_f$=1,500 m/s and $p_f$=1.0 g/cm$^3$. An array of strain seismic sensors 41–52 is deployed along the borehole 40.

An explosive source 70 was used in the simulation of the example given herein. The source was located 15 meters from the borehole center in the X direction. The finite difference modeling of the present invention outputs wave pressure and a single component displacement or particle velocity, and a seismic strain at each receiver location. The single component displacement or particle velocity represents the particle motion along the borehole in the axial 77 direction. As described hereinabove, in prior art seismic surveys, the seismic pressure is typically measured with hydrophones and the seismic displacement or velocity with geophones. For the seismic strain measurement device of the present invention, the seismic pressure can be measured by the hoop fiber (118 in FIGS. 5, 9 and 10) and the axial strain by the axial fibers (116 in FIGS. 5, 9 and 10). Although the seismic strain data measured by the seismic strain device as described is not adequate to obtain the total particle displacement/velocity data, as described hereinabove both geophone and seismic strain data contain the same information required for seismic imaging. Similarly, seismic strain and pressure may be measured by oblique sensors (114c, 112c in FIG. 5) in terms of wave magnitude and phase. The oblique sensors can sense the directionality information of the seismic waves, although resolving the oblique sensor data into wave components in relation to the borehole structure is non-trivial.

Figure 19:
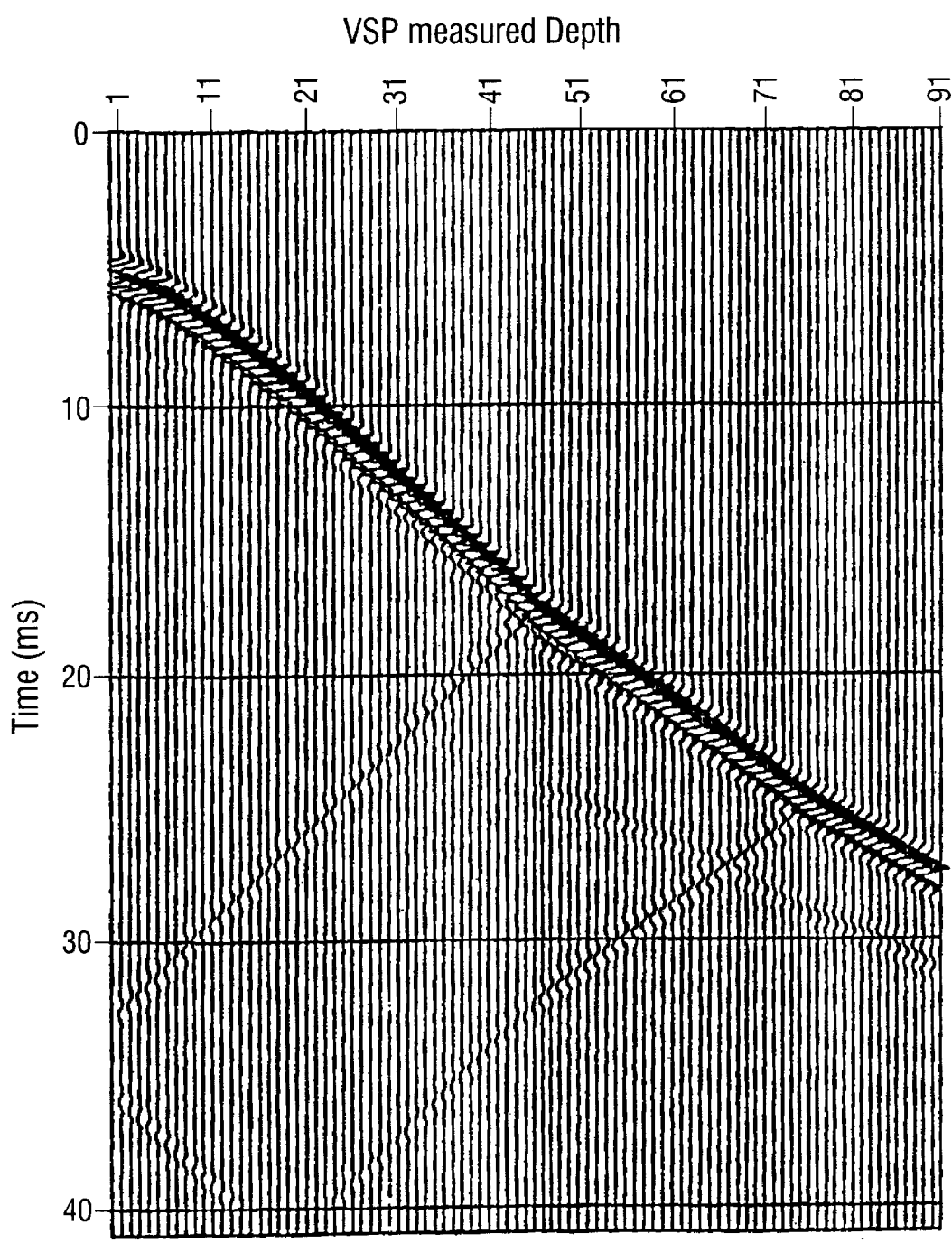
FIG. 19 is a graph of pressure seismic data for 90 traces showing a depth (meters) versus time (milliseconds).
Figure 20:
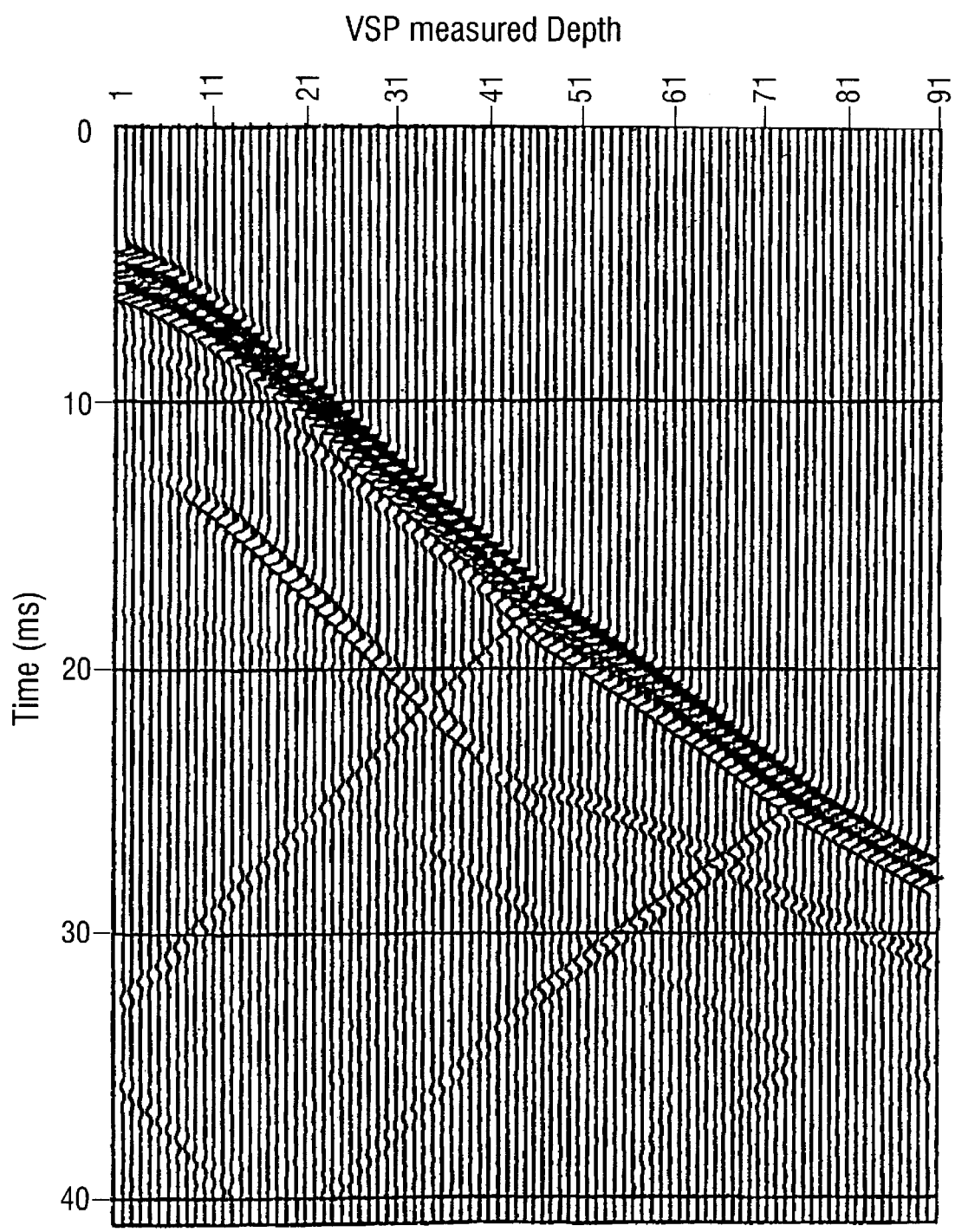
FIG. 20 is a graph of radial particle velocity seismic data for 90 traces showing a depth (meters) versus time (milliseconds).
Figure 21:
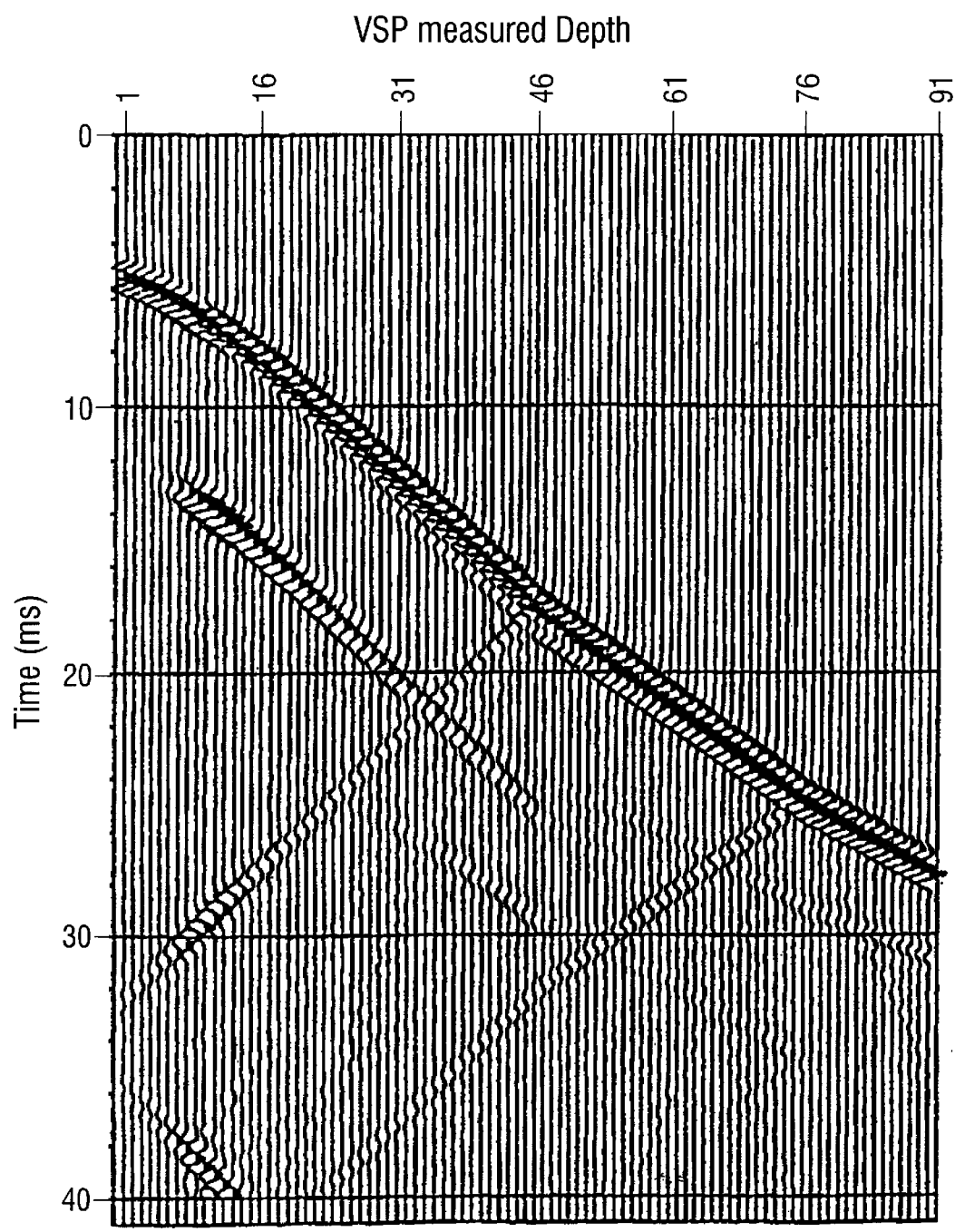
FIG. 21 is a graph of axial strain seismic data for 90 traces showing a depth (meters) versus time (milliseconds).

FIGS. 19 and 20 show the pressure and particle velocity seismograms generated by the above described example using a known finite difference modeling technique. FIG. 21 shows the axial strain seismogram generated by the simulation described hereinabove. One can notice the similarity in waveforms between particle velocity and strain seismic seismogram as noted in the comparison of equations (2) and (3) hereinabove.

The pressure, particle velocity, and strain seismic data are processed using a known standard vertical seismic profiling (VSP) processing technique. The goal of this processing is to verify that the seismic images of the layer boundaries in FIG. 4 can be correctly obtained using the various seismic data sets, especially using the strain seismic data.

Figure 26:
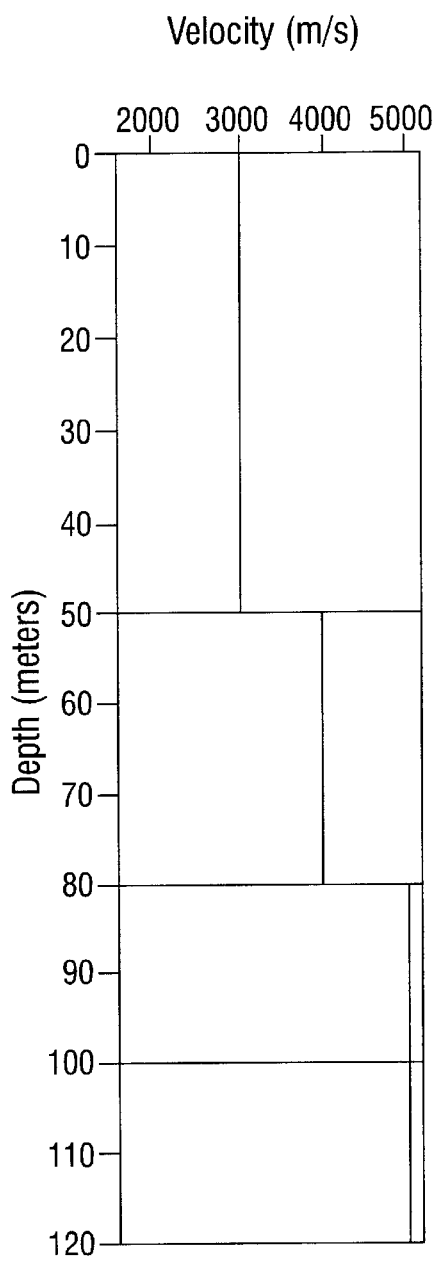
FIG. 26 is a graph of velocity (meters/second) versus depth (meters).
Figure 27:
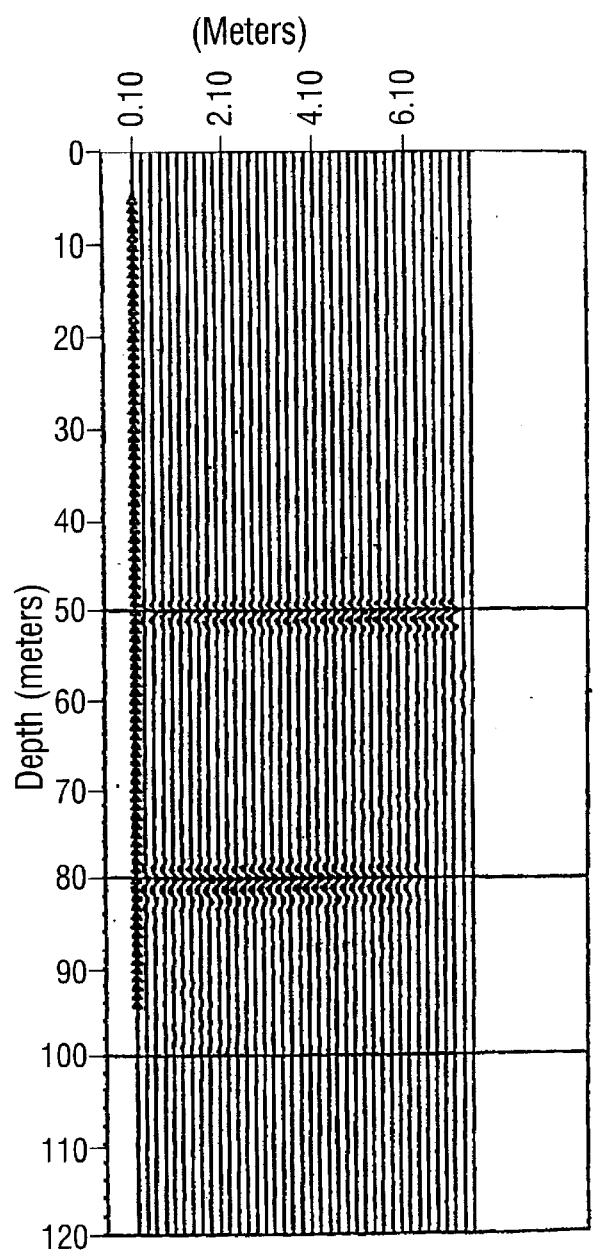
FIG. 27 is a graph of a CDP transform showing a depth (meters) versus an offset (meters) from the well.

FIGS. 22, 23, 24, 25, 26 and 27 show the seismic images from the pressure (FIGS. 22 and 23), velocity (FIGS. 24 and 25), and strain seismic data (FIGS. 26 and 27). The imaging technique used in this example is a well known VSP-CDP transform, which directly maps the seismic time series into depth domain using seismic ray theory. As shown in the figures, these images are almost identical in terms of the location and extent of the earth structure layers, showing that the present invention yields strain seismic data which produces valid seismic image as compared to conventional pressure (hydrophones) and particle velocity seismic data (geophones).

Figure 30:
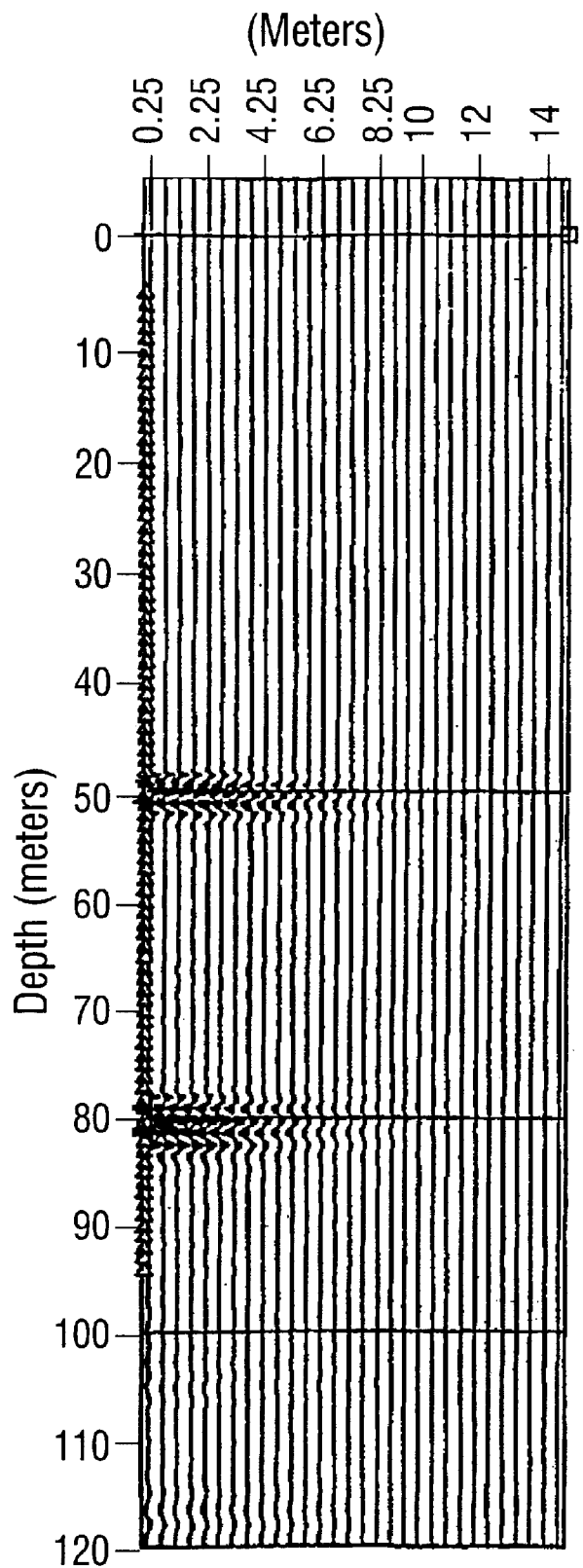
FIG. 30 is a graph of a VSP migration using axial strain data showing a depth (meters) versus an offset (meters) from the well.
Figure 31:
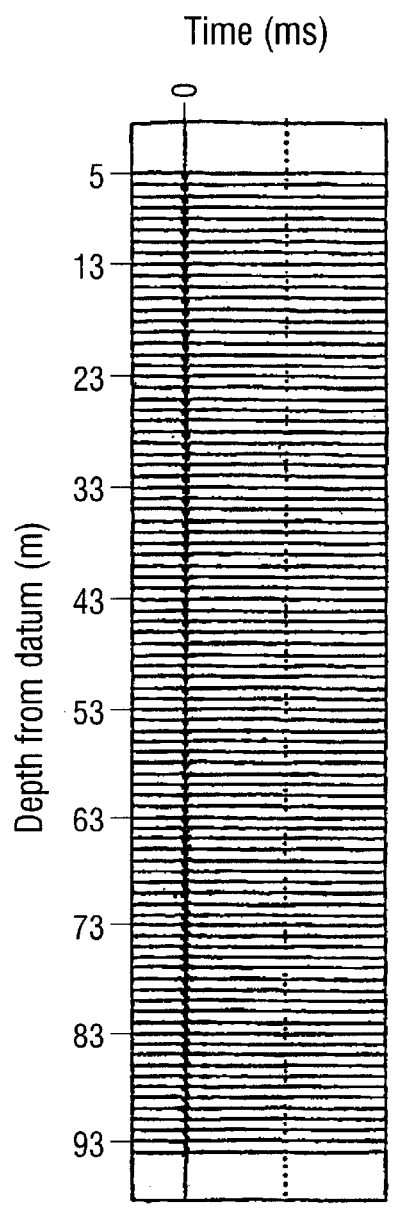
FIG. 31 is a graph of seismic data in depth (meters) versus time (milliseconds).
Figure 32:
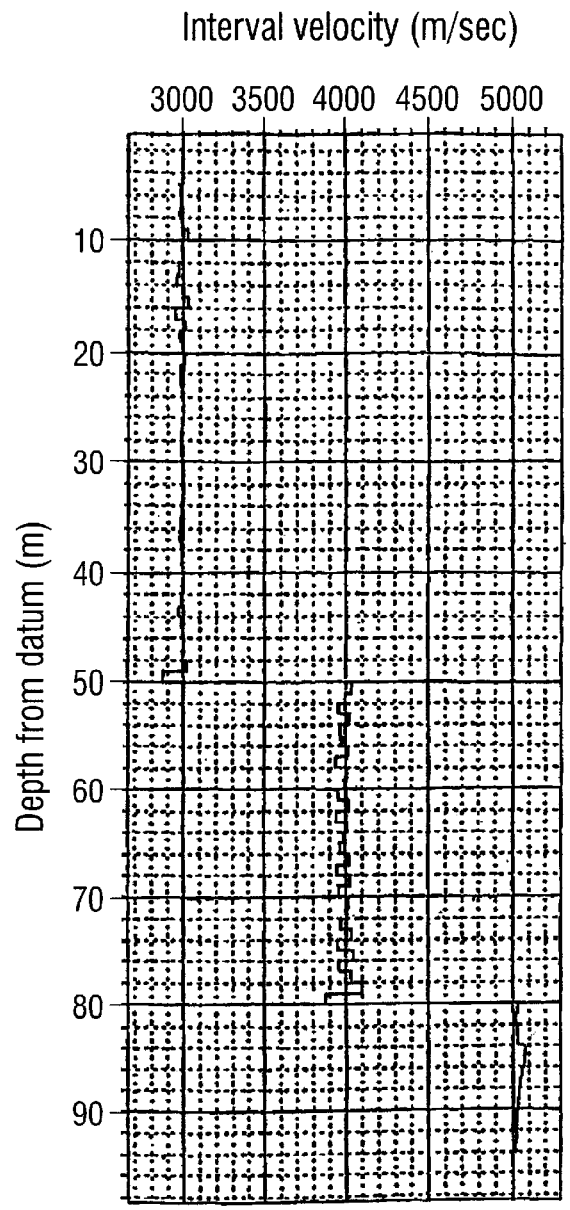
FIG. 32 is a graph of a model determined from the seismic data in FIG. 31 showing an interval velocity (meter/second) versus a depth (meters).
Figure 33:
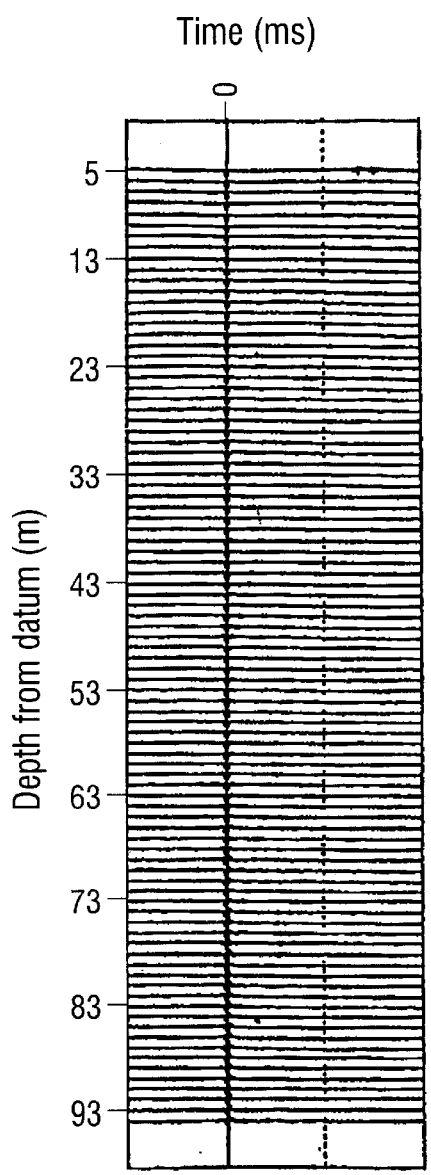
FIG. 33 is a graph of seismic data in depth (meters) versus time (milliseconds).
Figure 34:
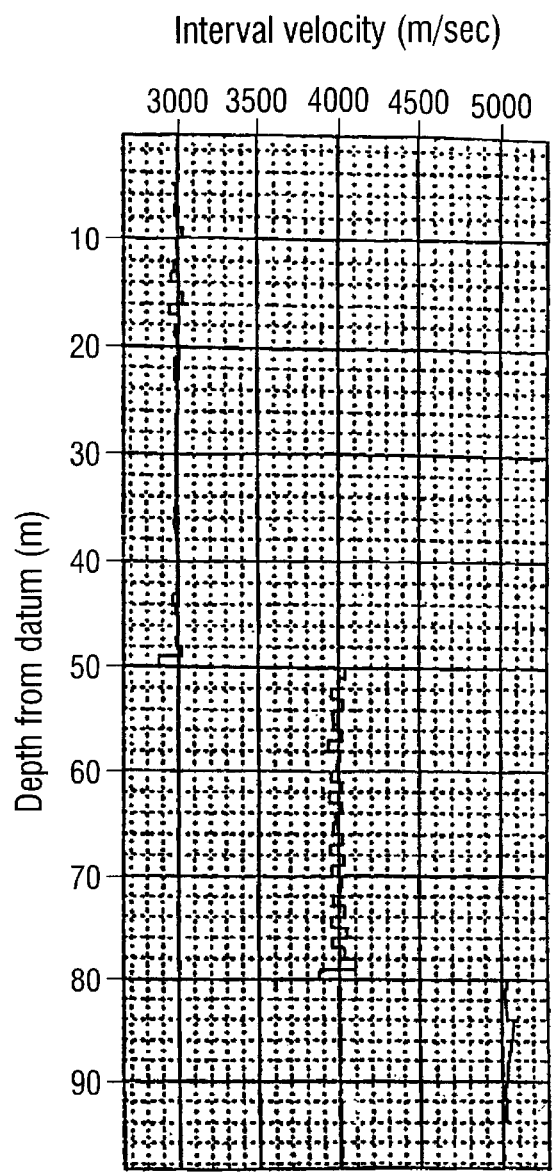
FIG. 34 is a graph of a model determined from the seismic data in FIG. 33 showing an interval velocity (meter/second) versus a depth (meters).

Strain seismic data of the present invention further shows similar results when Vertical Seismic Profiling (VSP) migration techniques are used to solve the wave equation and the known Kirchoff summation to get the earth structure images (see FIGS. 28, 29 and 30).

Strain seismic data of the present invention can also be used to calculate the formation velocities of each stratigraphic layer. FIGS. 31, 32, 33 and 34 are the velocity analysis plots calculated using pressure (FIGS. 31 and 32) and strain seismic data (FIGS. 33 and 34), respectively.

Theoretical analysis and numerical modeling examples as shown herein demonstrate that seismic strain measurements can be used to obtain seismic images that compare favorably with conventional pressure seismic data (hydrophones) and particle velocity seismic data (geophones). In the area of seismic imaging, seismic events, arrival times, and amplitudes are basic features used in imaging processes. This information is readily and accurately obtained in the strain seismic data of the present invention. Therefore, the strain seismic data measured using strain seismic sensors of the present invention offers many advantages over the prior art for most seismic imaging applications.

Figure 35:
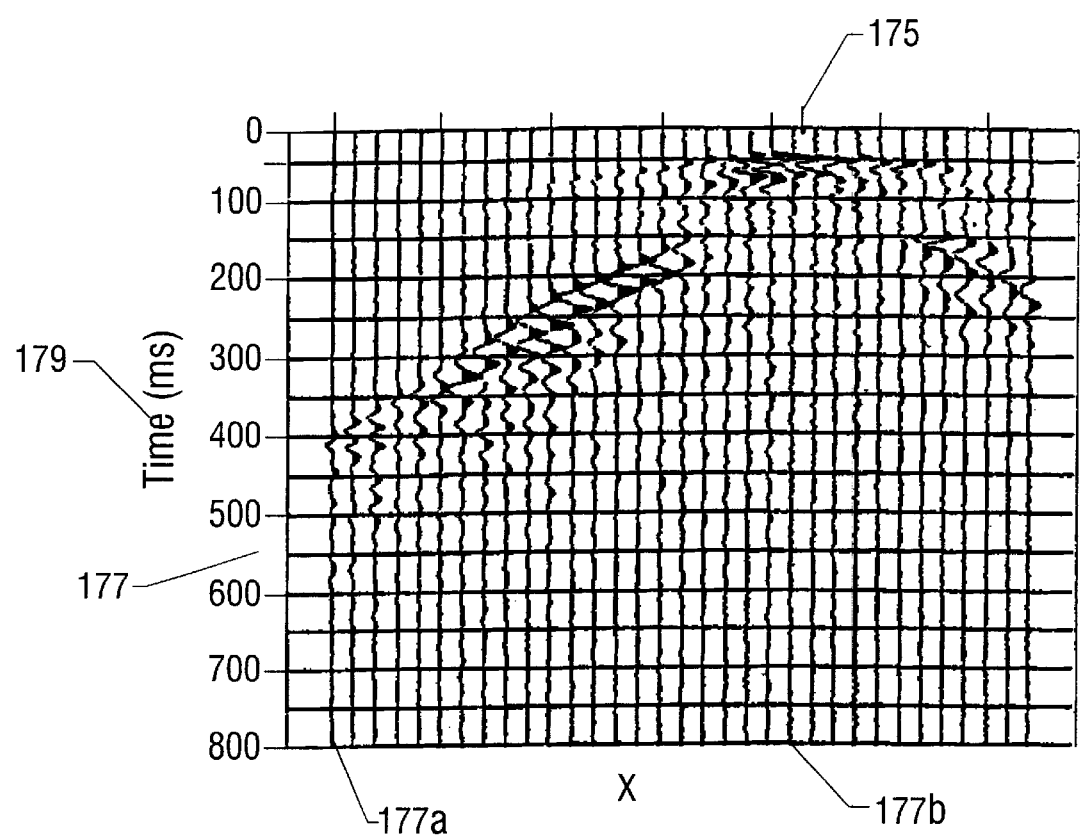
FIG. 35 is a seismic image in relation to a borehole structure produced by a strain seismic sensor system in accordance with the present invention.
Figure 36:
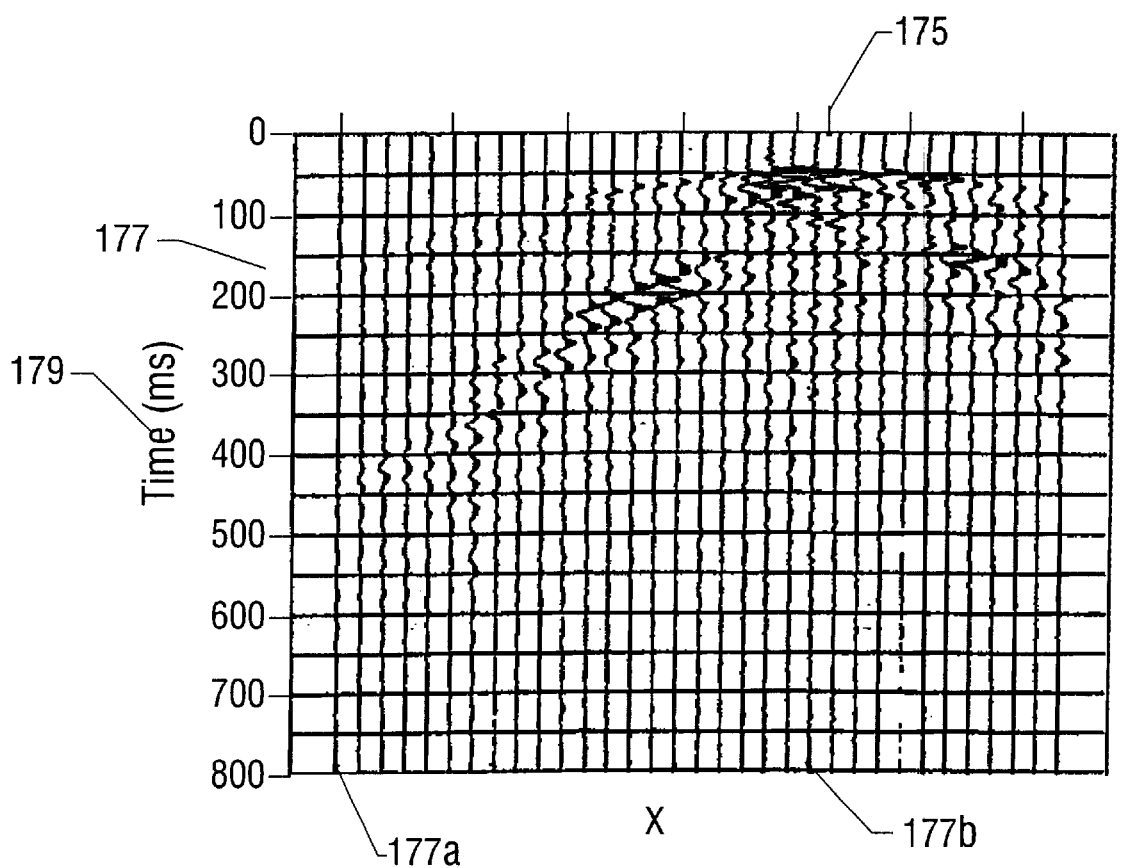
FIG. 36 is a seismic image in relation to a borehole structure using a geophone of the prior art.

Referring now to FIGS. 35 and 36 the performance of the present invention is described in relation to a specific example. FIG. 35 is plot of a series of seismic wave traces from an in-well strain seismic sensor in accordance with the present invention while FIG. 36 is a seismic wave trace from a geophone of the prior art mounted at the same location within the same test well. In both of the figures the relative position of the well and seismic sensors is represented by element 175 and the vertical trace lines, 177a and 177b for example, represent the position of a seismic shot along with the sensed magnitude and time delay. For instance, vertical trace 177a represents the response of the in-well seismic sensor for a seismic shot triggered approximately 120 feet from the well 175. Vertical trace 177b represents the response of the in-well seismic sensor for a seismic shot triggered approximately 5 feet from the well 175 while each the remainder of the traces represent seismic shots positioned linearly at approximately five foot intervals. These types of seismic wave traces are known in the industry wherein time delay is shown on the vertical axes 179 in milliseconds and the magnitude of the response is depicted by the horizontal peaks of the vertical trace. As can be seen, the wave signal response of the strain seismic sensor of the present invention as depicted in FIG. 35 is nearly equivalent to that of the wave signal response of the conventional geophone shown in FIG. 36. That is to say that the two wave signals exhibit the same compression and shear wave events that have similar wave arrival time, frequency and amplitude. This comparison shows the similarity between the strain seismic sensor of the present invention and that of a prior art geophone data for seismic imaging.

In addition to the borehole applications shown by way of example herein, the present invention includes any pipe structure implanted within the earth using the sensing system described in the invention to measure seismic disturbances. For example, a surface seismic survey could be conducted using a pipe that is trenched in just beneath the earth's surface on land or on the ocean bottom such that the same sensors are used to detect earth strain as a result of seismic disturbances. This configuration could also be used for earthquake seismology measurements.

Although the invention has been described and illustrated with respect to exemplary embodiments thereof, the foregoing and various other additions and omissions may be made therein and thereto without departing from the spirit and scope of the present invention.

We claim:

1. A seismic sensor for detecting a seismic disturbance in relation to a borehole structure wherein said borehole structure is rigidly solidly coupled to an earth formation, said seismic sensor comprising a strain sensor connected to said borehole structure for measuring a strain response of said structure to said seismic disturbance.

2. A seismic sensor as set forth in claim 1 wherein said sensor comprises a strain gauge.

3. A seismic sensor as set forth in claim 2 wherein said strain gauge comprises a piezoelectric strain gauge, an optical strain gauge, or a capacitive strain gauge.

4. A strain seismic survey system for performing a seismic survey of an earth formation in relation to a borehole, said system comprising a combined strain seismic sensor and borehole structure rigidly solidly coupled to said borehole, said sensor responsive to a strain response of said borehole structure to a seismic disturbance and further providing a signal indicative of said strain response of said borehole structure.

5. A seismic survey system according to claim 4,
wherein said combined strain seismic sensor and borehole structure includes a flexible carrier film having said strain sensor arranged therein or thereon and being disposed in relation to a packer/bladder in said borehole.

6. A seismic survey system according to claim 4,
wherein said strain sensor senses a hoop strain response of said borehole structure perpendicular to an axis of said borehole.

7. A seismic survey system according to claim 4,
wherein said strain sensor senses an axial strain response of said borehole structure parallel to an axis of said borehole.

8. A seismic survey system according to claim 4,
wherein said strain sensor senses a component of hoop strain response of said borehole structure oblique to an axis of said borehole.

9. A seismic survey system according to claim 4,
wherein said strain sensor senses a component of axial strain response of said borehole structure oblique to an axis of said borehole.

10. A strain seismic survey system for performing a seismic survey of an earth formation in relation to a borehole, comprising:
- a light source, detection measurement and signal processor device, for providing an optical signal, and responsive to a combined optical strain seismic sensor and borehole structure signal, for further providing seismic survey information about said earth formation in relation to said borehole depending on said information contained in said combined optical strain seismic sensor and borehole structure signal; and
- a combined strain seismic sensor and borehole structure rigidly solidly coupled to said borehole, responsive to said optical signal, and further responsive to a strain response of said borehole structure to a seismic disturbance, for providing said combined optical strain seismic sensor and borehole structure signal containing information about said seismic disturbance in relation to said borehole.

11. A seismic survey system according to claim 10 wherein said optical strain sensor comprises an optical fiber.

12. A seismic survey system according to claim 10 wherein said optical fiber has at least one Fiber Bragg Grating arranged therein.

13. A seismic survey system according to claim 10 wherein said combined optical strain seismic sensor and borehole structure includes either a coiled tubing or a production tube having an optical fiber wrapped therein or thereabout and being arranged in said borehole.

14. A seismic survey system according to claim 13,
wherein said optical fiber is wrapped in a hoop strain fiber loop perpendicular to an axis of said borehole.

15. A seismic survey system according to claim 13,
wherein said optical fiber is wrapped in an axial strain fiber loop parallel to an axis of said borehole.

16. A seismic survey system according to claim 13,
wherein said optical fiber is wrapped in a hoop strain fiber loop oblique to an axis of said borehole.

17. A seismic survey system according to claim 13,
wherein said optical fiber has at least one Fiber Bragg Grating arranged therein.

18. A seismic survey system according to claim 10, wherein said combined optical strain seismic sensor and borehole structure includes a well casing having an optical fiber wrapped therein or thereabout and being arranged in said borehole.

19. A seismic survey system according to claim 18,
wherein said optical fiber is wrapped in a hoop strain fiber loop perpendicular to an axis of said borehole.

20. A seismic survey system according to claim 18,
wherein said optical fiber is wrapped in an axial strain fiber loop parallel to an axis of said borehole.

21. A seismic survey system according to claim 18,
wherein said optical fiber is wrapped in a hoop strain fiber loop oblique to an axis of said borehole.

22. A seismic survey system according to claim 18,
wherein said optical fiber has at least one Fiber Bragg Grating arranged therein.

23. A process for performing a seismic survey of an earth formation in relation to a borehole, comprising:
- rigidly solidly coupling at least one combined strain seismic sensor and borehole structure having strain seismic sensor arranged therein or thereon to said borehole;
- providing a seismic disturbance in relation to said borehole;
- receiving a borehole structure strain response signal containing information about said seismic disturbance in relation to said borehole; and
- providing seismic survey information about said earth formation in relation to said borehole depending on said information contained in said combined borehole structure strain response signal.

24. A process according to claim 23, wherein rigidly solidly coupling at least one combined strain seismic sensor to said borehole structure comprises coupling a flexible carrier film having said strain seismic sensor arranged therein or thereon to a packer/bladder.

25. A process according to claim 24, wherein coupling said flexible carrier film includes positioning said strain seismic sensor in a hoop direction perpendicular to an axis of said borehole.

26. A process according to claim 24, wherein coupling said flexible carrier film includes positioning said strain seismic sensor in an axial direction parallel to an axis of said borehole.

27. A process according to claim 24, wherein coupling said flexible carrier film includes positioning said strain seismic sensor in a hoop direction oblique to an axis of said borehole.

28. A process according to claim 24, wherein rigidly solidly coupling said at least one combined strain seismic sensor and borehole structure in said borehole comprises rigidly solidly coupling a production tube having said strain seismic sensor therein or thereabout to said borehole.

29. A process for performing a seismic survey of an earth formation in relation to a borehole, comprising:
- rigidly solidly coupling at least one combined optical strain seismic sensor and bore hole structure having an optical fiber arranged therein or thereon to said borehole;
- providing an optical signal through said optical fiber;
- providing a seismic disturbance in relation to said borehole;
- receiving a combined optical seismic sensor and borehole structure signal containing information about said seismic disturbance in relation to said borehole; and
- providing seismic survey information about said earth formation in relation to said borehole depending on said information contained in said combined optical seismic sensor and borehole structure signal.

30. A process according to claim 29, wherein rigidly solidly coupling at least one combined strain seismic sensor to said borehole structure comprises rigidly coupling a flexible carrier film having said strain seismic sensor arranged therein or thereon to a packer/bladder to said borehole.

31. A process according to claim 30, wherein coupling said flexible carrier film includes wrapping said optical fiber in a hoop strain fiber loop perpendicular to an axis of said borehole.

32. A process according to claim 30, wherein coupling said flexible carrier film includes wrapping said optical fiber in an axial strain fiber loop parallel to an axis of said borehole.

33. A process according to claim 30, wherein coupling said flexible carrier film includes wrapping said optical fiber in a hoop strain fiber loop oblique to an axis of said borehole.

34. A process according to claim 30, wherein coupling said flexible carrier film includes providing said optical fiber with at least one Fiber Bragg Grating arranged therein.

35. A process according to claim 29, wherein rigidly solidly coupling at least one combined strain seismic sensor to said borehole structure comprises rigidly solidly coupling a production tube having said strain seismic sensor therein or thereabout to said borehole.

36. A process according to claim 35, wherein the strain seismic sensor comprises a hoop strain fiber loop wrapped perpendicular to an axis of said borehole.

37. A process according to claim 35, wherein the strain seismic sensor comprises an axial strain fiber loop wrapped parallel to an axis of said borehole.

38. A process according to claim 35, wherein the strain seismic sensor comprises a hoop strain fiber loop wrapped oblique to an axis of said borehole.

39. A process according to claim 35, wherein the strain seismic sensor comprises at least one Fiber Bragg Grating.

40. A process according to claim 29, wherein rigidly solidly coupling at least one combined strain seismic sensor to said borehole structure comprises rigidly coupling a well casing having said optical fiber wrapped therein or thereabout to said borehole.

41. A process according to claim 40, wherein the strain seismic sensor comprises a hoop strain fiber loop wrapped perpendicular to an axis of said borehole.

42. A process according to claim 40, wherein the strain seismic sensor comprises an axial strain fiber loop wrapped parallel to an axis of said borehole.

43. A process according to claim 40, wherein the strain seismic sensor comprises a hoop strain fiber loop wrapped oblique to an axis of said borehole.

44. A process according to claim 40, wherein the strain seismic sensor comprises at least one Fiber Bragg Grating.

45. A seismic sensor for sensing a disturbance in an earth formation, comprising:
   a flexible carrier film coupled to a borehole structure, and rigidly solidly coupled to the earth formation, for providing a flexible carrier film force; and
   an optical fiber coupled to the flexible carrier film and responsive to the flexible film carrier force, and further responsive to an optical light, for providing an optical seismic sensor signal containing information about the disturbance in the earth formation.

46. A seismic sensor according to claim 45,
   wherein the optical fiber includes a Fiber Bragg Grating sensor therein.

47. A seismic sensor according to claim 45,
   wherein the optical fiber is wrapped in a hoop strain fiber loop perpendicular to a longitudinal axis of the flexible film carrier.

48. A seismic sensor according to claim 45,
   wherein the optical fiber is arranged in an axial strain fiber loop parallel to a longitudinal axis of the flexible film carrier.

49. A seismic sensor according to claim 45, wherein the optical fiber is wrapped in a hoop strain fiber loop perpendicular to a longitudinal axis of the flexible film carrier, and wherein the optical fiber is arranged in an axial strain fiber loop parallel to a longitudinal axis of the flexible film carrier.

50. A seismic sensor according to claim 45, wherein the flexible film carrier includes a layer of rubber, and wherein the optical fiber is embedded in the layer of rubber.

51. A seismic sensor according to claim 45,
   wherein the flexible film carrier is a layer of rubber arranged between an outer layer of a horseshoe shaped inflatable bladder/packer and either a production tubing, a well casing or both in a borehole of a well.

52. A strain seismic survey system for performing a seismic survey of an earth formation in relation to a borehole, comprising:
   a light source, detection measurement and signal processor device, for providing an optical signal, and responsive to a combined optical strain seismic sensor and borehole structure signal, for further providing seismic survey information about said earth formation in relation to said borehole depending on said information contained in said combined optical strain seismic sensor and borehole structure signal; and
   a combined strain seismic sensor and borehole structure arranged in said borehole, responsive to said optical signal, and further responsive to a strain response of said borehole structure to a seismic disturbance, for providing said combined optical strain seismic sensor and borehole structure signal containing information about said seismic disturbance in relation to said borehole,
   wherein said combined optical strain seismic sensor and borehole structure includes either a coiled tubing or a production tube having an optical fiber wrapped therein or thereabout and being arranged in said borehole, and
   wherein said optical fiber is wrapped in either a hoop strain fiber loop perpendicular to an axis of said borehole, an axial strain fiber loop parallel to an axis of said borehole, or a hoop strain fiber loop oblique to an axis of said borehole.

53. The strain seismic survey system of claim 52, wherein the optical fiber includes a Fiber Bragg Grating.

54. A strain seismic survey system for performing a seismic survey of an earth formation in relation to a borehole, comprising:
   a light source, detection measurement and signal processor device, for providing an optical signal, and responsive to a combined optical strain seismic sensor and borehole structure signal, for further providing seismic survey information about said earth formation in relation to said borehole depending on said information contained in said combined optical strain seismic sensor and borehole structure signal; and
   a combined strain seismic sensor and borehole structure arranged in said borehole, responsive to said optical signal, and further responsive to a strain response of said borehole structure to a seismic disturbance, for providing said combined optical strain seismic sensor and borehole structure signal containing information about said seismic disturbance in relation to said borehole,
   wherein said combined optical strain seismic sensor and borehole structure includes a well casing having an optical fiber wrapped therein or thereabout and being arranged in said borehole, and
   wherein said optical fiber is wrapped in either a hoop strain fiber loop perpendicular to an axis of said borehole, an axial strain fiber loop parallel to an axis of said borehole, or a hoop strain fiber loop oblique to an axis of said borehole.

55. The strain seismic survey system of claim 54, wherein the optical fiber includes a Fiber Bragg Grating.

56. A process for performing a seismic survey of an earth formation in relation to a borehole, comprising said steps of:
   arranging a flexible carrier film having a strain seismic sensor arranged therein or thereon and being disposed in relation to a packer/bladder in said borehole,
   wherein said arrangement includes either positioning said strain seismic sensor in a hoop direction perpendicular to an axis of said borehole, positioning said strain seismic sensor in an axial direction parallel to an axis of said borehole, or positioning said strain seismic sensor in a hoop direction oblique to an axis of said borehole;

providing a seismic disturbance in relation to said borehole;

receiving a borehole structure strain response signal containing information about said seismic disturbance in relation to said borehole; and providing seismic survey information about said earth formation in relation to said borehole depending on said information contained in said combined borehole structure strain response signal.

57. The process of claim 56, wherein the sensor includes a Fiber Bragg Grating.

58. A process for performing a seismic survey of an earth formation in relation to a borehole, comprising said steps of:

arranging a flexible carrier film having an optical fiber arranged therein or thereon and being disposed in relation to a packer/bladder in said borehole, wherein said arrangement includes either wrapping said optical fiber in a hoop strain fiber loop perpendicular to an axis of said borehole, wrapping said optical fiber in an axial strain fiber loop parallel to an axis of said borehole, or wrapping said optical fiber in a hoop strain fiber loop oblique to an axis of said borehole;

providing an optical signal through said optical fiber;

providing a seismic disturbance in relation to said borehole;

receiving a combined optical seismic sensor and borehole structure signal containing information about said seismic disturbance in relation to said borehole; and providing seismic survey information about said earth formation in relation to said borehole depending on said information contained in said combined optical seismic sensor and borehole structure signal.

59. The process of claim 58, wherein the optical fiber includes a Fiber Bragg Grating.

60. A process for performing a seismic survey of an earth formation in relation to a borehole, comprising said steps of:

arranging a production tube having an optical fiber wrapped therein or thereabout in said borehole, wherein said arrangement includes either wrapping said optical fiber in a hoop strain fiber loop perpendicular to an axis of said borehole, wrapping said optical fiber in an axial strain fiber loop parallel to an axis of said borehole, or wrapping said optical fiber in a hoop strain fiber loop oblique to an axis of said borehole;

providing an optical signal through said optical fiber;

providing a seismic disturbance in relation to said borehole;

receiving a combined optical seismic sensor and borehole structure signal containing information about said seismic disturbance in relation to said borehole; and providing seismic survey information about said earth formation in relation to said borehole depending on said information contained in said combined optical seismic sensor and borehole structure signal.

61. The process of claim 60, wherein the optical fiber includes a Fiber Bragg Grating.

62. A process for performing a seismic survey of an earth formation in relation to a borehole, comprising said steps of:

arranging a well casing having an optical fiber arranged therein or thereon and being disposed in said borehole, wherein said arrangement includes either wrapping said optical fiber in a hoop strain fiber loop perpendicular to an axis of said borehole, wrapping said optical fiber in an axial strain fiber loop parallel to an axis of said borehole, or wrapping said optical fiber in a hoop strain fiber loop oblique to an axis of said borehole;

providing an optical signal through said optical fiber;

providing a seismic disturbance in relation to said borehole;

receiving a combined optical seismic sensor and borehole structure signal containing information about said seismic disturbance in relation to said borehole; and providing seismic survey information about said earth formation in relation to said borehole depending on said information contained in said combined optical seismic sensor and borehole structure signal.

63. The process of claim 62, wherein the optical fiber includes a Fiber Bragg Grating.

64. A seismic sensor for sensing a disturbance in an earth formation, comprising:

a flexible carrier film, responsive to the disturbance in the earth formation, for providing a flexible carrier film force; and an optical fiber, responsive to the flexible film carrier force, and further responsive to an optical light, for providing an optical seismic sensor signal containing information about the disturbance in the earth formation, wherein the optical fiber is wrapped in a hoop strain fiber loop perpendicular to a longitudinal axis of the flexible film carrier.

65. The seismic sensor of claim 64, wherein the optical fiber includes a Fiber Bragg Grating.

66. A seismic sensor for sensing a disturbance in an earth formation, comprising:

a flexible carrier film, responsive to the disturbance in the earth formation, for providing a flexible carrier film force; and an optical fiber, responsive to the flexible film carrier force, and further responsive to an optical light, for providing an optical seismic sensor signal containing information about the disturbance in the earth formation, wherein the optical fiber is wrapped in a hoop strain fiber loop perpendicular to a longitudinal axis of the flexible film carrier, and wherein the optical fiber is arranged in an axial strain fiber loop parallel to a longitudinal axis of the flexible film carrier.

67. The seismic sensor of claim 66, wherein the optical fiber includes a Fiber Bragg Grating.

68. A system for performing a seismic survey of an earth formation in relation to a borehole, comprising at least one sensor in contact with a borehole structure, wherein the borehole structure is rigidly solidly coupled to the borehole, and wherein the sensor provides a signal responsive to a seismic disturbance.

69. The system of claim 68, wherein the sensor comprises a strain gauge.

70. The system of claim 69, wherein the strain gauge is selected from the group consisting of a piezoelectric strain gauge, an optical strain gauge, and a capacitive strain gauge.

71. The system of claim 68, wherein the borehole structure is selected from the group consisting of a packer, a well casing, a coiled tubing, and a production tube.

72. The system of claim 68, wherein the sensor appears either inside, outside, or within the borehole structure.

73. The system of claim 68, wherein the borehole structure is a packer/bladder, and wherein the sensor is coupled to a carrier film in contact with the packer/bladder.

74. The system of claim 68, wherein the borehole structure is rigidly solidly coupled to the borehole through cement.

75. The system of claim 68, wherein the sensor comprises an optical fiber, and wherein the optical fiber is wound in an arrangement selected from the group consisting of perpendicular to an axis of the borehole, parallel to an axis of the borehole, or oblique to an axis of the borehole.

76. The system of claim 75, wherein the optical fiber contains at least one Fiber Bragg Grating.

77. The system of claim 68, wherein the sensor comprises an optical fiber.

78. The system of claim 77, wherein the sensor comprises a Fiber Bragg Grating.

79. The system of claim 77, further comprising a subsystem for sending light to interrogate the sensor and for receiving the signal responsive to the seismic disturbance.

80. A method for performing a seismic survey of an earth formation in relation to a borehole, comprising:
 providing at least one sensor connected to a borehole structure;
 rigidly solidly coupling the borehole structure to the borehole;
 providing a seismic disturbance in relation to the borehole; and
 receiving a signal from the sensor indicative of the structure of the earth formation.

81. The method of claim 68, wherein the sensor comprises a strain gauge.

82. The method of claim 81, wherein the strain gauge is selected from the group consisting of a piezoelectric strain gauge, an optical strain gauge, and a capacitive strain gauge.

83. The method of claim 80, wherein the borehole structure is selected from the group consisting of a packer, a well casing, a coiled tubing, and a production tube.

84. The method of claim 80, wherein the sensor appears either inside, outside, or within the borehole structure.

85. The method of claim 85, wherein the borehole structure is a packer/bladder, and
 wherein the sensor is coupled to a carrier film in contact with the packer/bladder.

86. The method of claim 80, mechanically coupling the borehole structure to the borehole involves the use of concrete.

87. The method of claim 85, wherein the sensor comprises an optical fiber, and
 wherein the optical fiber is wound in an arrangement selected from the group consisting of perpendicular to an axis of the borehole, parallel to an axis of the borehole, or oblique to an axis of the borehole.

88. The method of claim 87, wherein the optical fiber contains at least one Fiber Bragg Grating.

89. The method of claim 80, wherein the sensor comprises an optical fiber.

90. The method of claim 89, wherein the sensor comprises a Fiber Bragg Grating.

91. The method of claim 89, further comprising a subsystem for sending light to interrogate the sensor and for receiving the signal responsive to the seismic disturbance.

* * * * *